(12) United States Patent
Emerick

(10) Patent No.: US 10,011,909 B2
(45) Date of Patent: Jul. 3, 2018

(54) METHOD AND SYSTEM FOR HYDROGEN PRODUCTION AND A METHOD OF INTEGRATING THE HYDROGEN PRODUCTION WITH AN ENGINE

(71) Applicant: Envirowerks, LLC., Mansfield Center, CT (US)

(72) Inventor: Patrick Emerick, Spencer, MA (US)

(73) Assignee: ENVIROWERKS, LLC., Mansfield Center, CT (US)

( * ) Notice: Subject to any disclaimer, the term of this patent is extended or adjusted under 35 U.S.C. 154(b) by 0 days.

(21) Appl. No.: 15/520,602

(22) PCT Filed: Nov. 11, 2015

(86) PCT No.: PCT/US2015/060111
§ 371 (c)(1),
(2) Date: Apr. 20, 2017

(87) PCT Pub. No.: WO2016/077433
PCT Pub. Date: May 19, 2016

(65) Prior Publication Data
US 2017/0314143 A1   Nov. 2, 2017

Related U.S. Application Data

(60) Provisional application No. 62/078,298, filed on Nov. 11, 2014.

(51) Int. Cl.
*C25B 15/08* (2006.01)
*C25B 1/02* (2006.01)
(Continued)

(52) U.S. Cl.
CPC ............... *C25B 1/02* (2013.01); *C25B 9/08* (2013.01); *C25B 15/08* (2013.01); *F02M 25/12* (2013.01)

(58) Field of Classification Search
CPC ................................. C25B 15/08; C25B 1/02
See application file for complete search history.

(56) References Cited

U.S. PATENT DOCUMENTS 5,272,871 A   12/1993   Oshima et al.
6,270,636 B1   8/2001   Byron et al.
(Continued)

OTHER PUBLICATIONS

International Search Report for International Application No. PCT/US2015/060111; International Filing Date Nov. 11, 2015; dated Jan. 22, 2016; 7 pages.
(Continued)

*Primary Examiner* — Nicholas A Smith
(74) *Attorney, Agent, or Firm* — Cantor Colburn LLP

(57) ABSTRACT

In an embodiment, a method comprises adding a methanol feed stream from a source methanol reservoir to a loop; wherein the loop comprises an electrolyzer, a base methanol reservoir, an electrolyzer inlet stream that directs a methanol mixture from the base methanol reservoir to the electrolyzer, and a methanol carbon dioxide stream that directs an unreacted methanol from the electrolyzer to the base methanol reservoir; and maintaining a methanol concentration in the base methanol reservoir through the opening and closing of a purge valve that allows a purge stream to flow from the base methanol reservoir to the source methanol reservoir and through the opening and closing of a feed valve that allows the methanol feed stream to flow from the source methanol reservoir into the loop. A product hydrogen stream can be recovered for use in an engine.

20 Claims, 7 Drawing Sheets

(51) Int. Cl.
*C25B 9/08* (2006.01)
*F02M 25/12* (2006.01)

(56) References Cited

U.S. PATENT DOCUMENTS

| | | |
|---|---|---|
| 6,432,284 B1 | 8/2002 | Narayanan et al. |
| 7,432,008 B2 | 10/2008 | Joos et al. |
| 7,523,607 B2 | 4/2009 | Sullivan |
| 8,715,470 B2 | 5/2014 | Ballantine et al. |
| 8,720,390 B2 | 5/2014 | Lee |
| 2003/0121481 A1 | 7/2003 | Dodd et al. |
| 2009/0217641 A1 | 9/2009 | Lloyd et al. |
| 2010/0104904 A1* | 4/2010 | Rao ............................ C25B 1/02 429/412 |
| 2012/0085710 A1 | 4/2012 | Meyer-Pittroff |

OTHER PUBLICATIONS

Written Opinion of the International Search Report for International Application No. PCT/US2015/060111; International Filing Date Nov. 11, 2015; dated Jan. 22, 2016; 5 pages.

* cited by examiner

METHOD AND SYSTEM FOR HYDROGEN PRODUCTION AND A METHOD OF INTEGRATING THE HYDROGEN PRODUCTION WITH AN ENGINE

CROSS REFERENCE TO RELATED APPLICATIONS

This application is a National Stage application of PCT/US2015/060111, filed Nov. 11, 2015, which claims the benefit of U.S. Provisional Application No. 62/078,298, filed Nov. 11, 2014, both of which are incorporated by reference in their entirety herein.

TECHNICAL FIELD

This disclosure relates to a method and system for hydrogen production and a method of integrating the hydrogen production with an engine.

BACKGROUND

When hydrogen is added to a combustion fuel in a compression ignition engine, a reduction in the brake specific fuel consumption and emissions can be achieved. This reduction can be achieved because hydrogen ignites and burns rapidly, helping to vaporize and mix the combustion fuel with the oxygen, resulting in a faster combustion reaction. The addition of hydrogen can have further profound effects in engines utilizing oxygen restriction techniques. For example, when a lower concentration of nitrogen oxides is desired, the hydrogen can counteract the ignition delay caused by a lack of oxygen. This reduction in an ignition delay can result in the engine achieving a peak cylinder pressure earlier in the power-stroke, for example, of a 4-cycle engine, which can allow for an increased expansion time, and ultimately in more work per each combustion event. The use of liquid hydrogen or gaseous hydrogen in such an engine is not practical from a safety standpoint. Furthermore, liquid hydrogen must be refrigerated which, is itself an energy intensive process and gaseous hydrogen is expensive, it lacks an established infrastructure, and appropriate storage equipment is expensive and not easily procured.

An improved method of providing hydrogen that can be used in a combustion engine and a method of controlling its addition to the engine is therefore desired.

BRIEF SUMMARY

Disclosed herein are a method and system for hydrogen production and a method of integrating the hydrogen production with an engine.

In an embodiment, a system for producing hydrogen comprises a source methanol reservoir comprising a source methanol outlet and a source methanol inlet; a methanol electrolyzer for converting methanol to hydrogen and carbon dioxide, wherein the methanol electrolyzer comprises an electrolyzer inlet, a electrolyzer hydrogen outlet, and a electrolyzer methanol outlet; a base methanol reservoir comprising a reservoir methanol inlet, a reservoir hydrogen outlet, and a reservoir methanol outlet, wherein the electrolyzer methanol outlet is in fluid communication with the reservoir methanol inlet, wherein the reservoir methanol outlet is in fluid communication with the electrolyzer inlet and the source methanol inlet; wherein the methanol electrolyzer and the base methanol reservoir form a methanol loop.

In an embodiment, a method of forming hydrogen comprises adding a methanol feed stream comprising a feed methanol from a source methanol reservoir to a methanol loop; wherein the methanol loop comprises an electrolyzer, a base methanol reservoir, an electrolyzer inlet stream that directs a methanol mixture from the base methanol reservoir to the electrolyzer, and a methanol carbon dioxide stream that directs an unreacted methanol from the electrolyzer to the base methanol reservoir; electrolyzing the electrolyzer inlet stream in the electrolyzer to form hydrogen and carbon dioxide; directing a methanol carbon dioxide stream comprising the carbon dioxide and an unreacted methanol from the electrolyzer to the base methanol reservoir; removing a hydrogen stream comprising the hydrogen from the electrolyzer; removing a reservoir outlet stream and a circulated stream from the base methanol reservoir; adding at least a portion of the circulated stream to the electrolyzer inlet stream; maintaining a methanol concentration in the base methanol reservoir through the opening and closing of a purge valve that allows a purge stream to flow from the methanol loop to the source methanol reservoir and through the opening and closing of a feed valve that allows the methanol feed stream to flow from the source methanol reservoir into the methanol loop.

In an embodiment, an electrolyzer cell assembly, comprise an exchange membrane disposed between an anode and a cathode; one or both of an anode support screen disposed on an anode side of the exchange membrane and a cathode support screen disposed on a cathode side of the exchange membrane; an optional anode gas diffusion layer disposed on the anode side of the exchange membrane and between the anode support screen and the exchange membrane; a cathode diffusion layer disposed on the cathode side of the exchange membrane and between the cathode support screen and the exchange membrane; an anode flow field disposed on the anode side of the exchange membrane; and a cathode flow field disposed on the cathode side of the exchange membrane; wherein the anode flow field and the cathode flow field each comprise a flow channel.

In an embodiment, a computer implemented control method comprises determining a methanol concentration of a methanol solution in a methanol loop; optionally determining an ambient air temperature; retrieving a heating temperature set point based on the methanol concentration and setting the heating temperature set point in the electrolyzer; determining a methanol concentration set point and a maintenance level concentration based on determining that an elapsed time since the setting the heating temperature set point is greater than or equal to a time threshold; calculating the maintenance level concentration based on determining that the elapsed time is less than the time threshold; measuring a time period prior to repeating the control method.

In an embodiment, a computer implemented control method for controlling a mass hydrogen flow in an engine comprises determining a mass air flow, an air to fuel ratio, an exhaust gas temperature, and an engine coolant temperature; retrieving an engine coolant temperature correction factor based on determining that the engine coolant temperature is greater than a threshold engine coolant temperature; retrieving an exhaust gas temperature correction factor based on determining that the exhaust gas temperature is greater than a threshold exhaust gas temperature; retrieving a mass air flow rate of change correction factor based on determining a mass air flow rate of change; calculating a diesel mass flow based determining that hydrogen is not being injected into an engine; or modifying the air to fuel ratio to account for oxygen being used to oxidize hydrogen based on determining that hydrogen is being injected and then calculating the diesel mass flow; wherein the diesel mass flow is determined based on the mass air flow and the air to fuel ratio; retrieving and setting a mass hydrogen flow based on the mass air flow and the air to fuel ratio; calculating a corrected mass hydrogen flow based on the mass hydrogen flow, the engine coolant temperature correction factor, the exhaust gas temperature correction factor, the mass air flow rate of change correction factor, a mass air flow adaptive tuning correction factor, and a scaling hydrogen mass flow correction factor; outputting the corrected mass hydrogen flow and changing the mass hydrogen flow; and repeating the method based on the engine still running.

The above described and other features are exemplified by the following figures and detailed description.

BRIEF DESCRIPTION OF THE DRAWINGS

Refer now to the figures, which are exemplary embodiments, and wherein the like elements are numbered alike.

DETAILED DESCRIPTION

Figure 1:
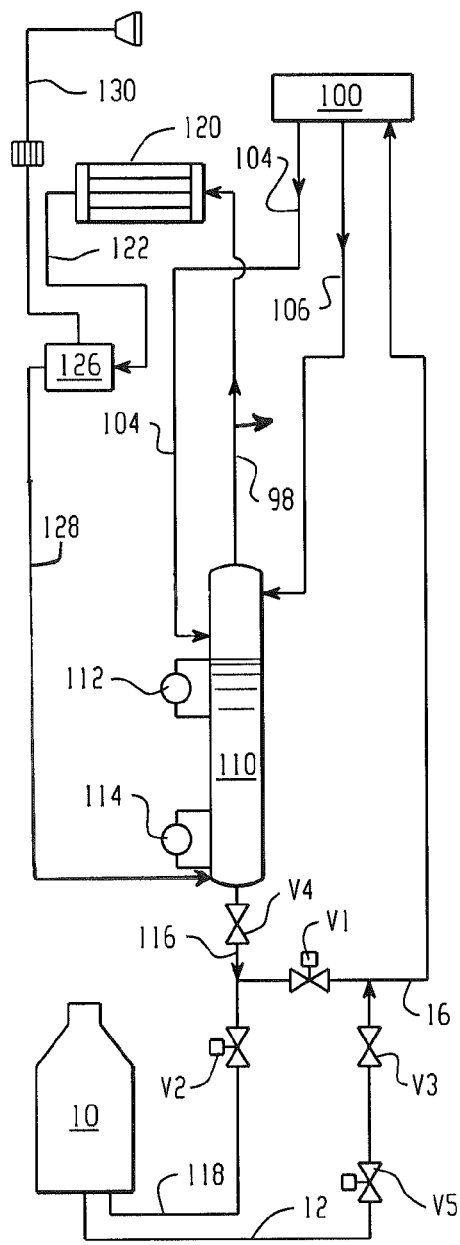
FIGS. 1-3 are illustrations of embodiments of the hydrogen production system.

Water electrolysis has been considered as a method to produce the hydrogen for use in combustion engines. Such combustion systems though have several significant drawbacks. For example, the oxygen reduction reaction involved with water electrolysis is energy intensive requiring significant energy per unit of hydrogen produced, and the water used for the reaction must be of a high purity, involving a costly filtering system, for example, at the filling location. Furthermore, because engines can be used in ambient temperatures that are below the freezing point of water (0 degrees Celsius (° C.)), the addition of freeze protection equipment adds both cost and energy requirements to the system. The inventors hereof have surprisingly discovered a system and method of producing hydrogen that utilizes methanol as the hydrogen carrier that can be used with a combustion engine. The method comprises adding a methanol feed stream comprising a feed methanol from a source methanol reservoir to a methanol loop; wherein the methanol loop comprises an electrolyzer, a base methanol reservoir, an electrolyzer inlet stream that directs a methanol mixture from the base methanol reservoir to the electrolyzer, and a methanol carbon dioxide stream that directs unreacted methanol and product carbon dioxide from the electrolyzer to the base methanol reservoir; and maintaining a methanol concentration in the methanol loop through the opening and closing of a purge valve that allows a purge stream to flow from the base methanol reservoir to the source methanol reservoir and through the opening and closing of a feed valve that allows the methanol feed stream to flow from the source methanol reservoir into the loop. A product hydrogen stream that can optionally further comprise a product carbon dioxide can be recovered that can be used in a combustion engine.

The present method, using methanol as the hydrogen carrier has several significant advantages over a system using compressed hydrogen, liquid hydrogen, or water. For example, as compared to the hydrogen, methanol has a higher hydrogen density per unit volume than liquid hydrogen, allowing the methanol to hold more hydrogen per liter. As compared to water, methanol was found to be advantageous as methanol has a lower freezing point of −98° C. as compared to water, enabling use without freeze protection in conditions of lower ambient temperatures; methanol has a lower oxidation potential than water, allowing for more efficient conversion to hydrogen; methanol electrolysis can be about three times more efficient than water electrolysis under practical operating conditions; and methanol electrolysis can result in an increase in the hydrogen produced per unit area of a catalyst present as compared to water electrolysis. It was further found that one or more of these advantages can make the present system even more desirable in engines with a limited alternator capacity as a suitable amount hydrogen can be produced without upgrading the vehicle's charging system.

It is noted that while that the term methanol generally refers to the compound of the molecular structure $CH_3OH$, as used herein, it can likewise encompass an alkyl alcohol in general. For example, the present disclosure can electrolyze methanol, ethanol, propanol, or a combination comprising at least one of the foregoing.

The present method of producing hydrogen can comprise adding a methanol feed stream comprising a feed methanol from a source methanol reservoir to a methanol loop, wherein the methanol loop comprises an electrolyzer, a base methanol reservoir, an electrolyzer inlet stream that directs a methanol mixture from the base methanol reservoir to the electrolyzer, and a methanol carbon dioxide stream that directs unreacted methanol and product carbon dioxide from the electrolyzer to the base methanol reservoir. A methanol loop is illustrated FIGS. 1 and 2, where at least a portion of circulated stream 116 is directed to electrolyzer inlet stream 16 such that base methanol reservoir 110 is in fluid communication with electrolyzer 100, and such that electrolyzer 100 is in fluid communication with base methanol reservoir 110 via methanol carbon dioxide stream 104.

Source methanol reservoir 10 is in fluid communication with the methanol loop. Source methanol reservoir 10 can comprise one or more fluid level sensor(s) 8. Methanol can be added to the methanol loop via methanol feed stream 12. For example, methanol can be added via methanol feed stream 12 to electrolyzer inlet stream 16. While methanol feed stream 12 is illustrated as being present in the loop downstream of base methanol reservoir 110, it is understood that the methanol could likewise be added directly to base methanol reservoir 110 or to the loop upstream of base methanol reservoir 110 and downstream of electrolyzer 100.

Source methanol reservoir 10 comprises a feed methanol. The feed methanol can comprise 10 to 100 weight percent (wt %), or 25 to 100 wt %, or 50 to 90 wt %, or 60 to 80 wt %, of methanol based on the total weight of feed methanol. Source methanol reservoir 10 can have a pressure of 80 to 200 kilopascal (kPa) absolute, for example, source methanol reservoir 10 can be at atmospheric pressure. Source methanol reservoir 10 can comprise greater than or equal to 5 volume percent (vol %) of methanol based on the total volume of the feed methanol.

Electrolyzer inlet stream 16 can be directed to electrolyzer 100. At least a portion of the methanol is electrolyzed in the electrolyzer to form hydrogen and carbon dioxide. The anode side reaction, the cathode side reaction, and the overall reaction that is occurring in the electrolyzer are Anode: $CH_3OH + H_2O > CO_2 + 6H^+ + 6e^-$;

Cathode: $6H^+ + 6e^- > 3H_2$; and

Figure 2:
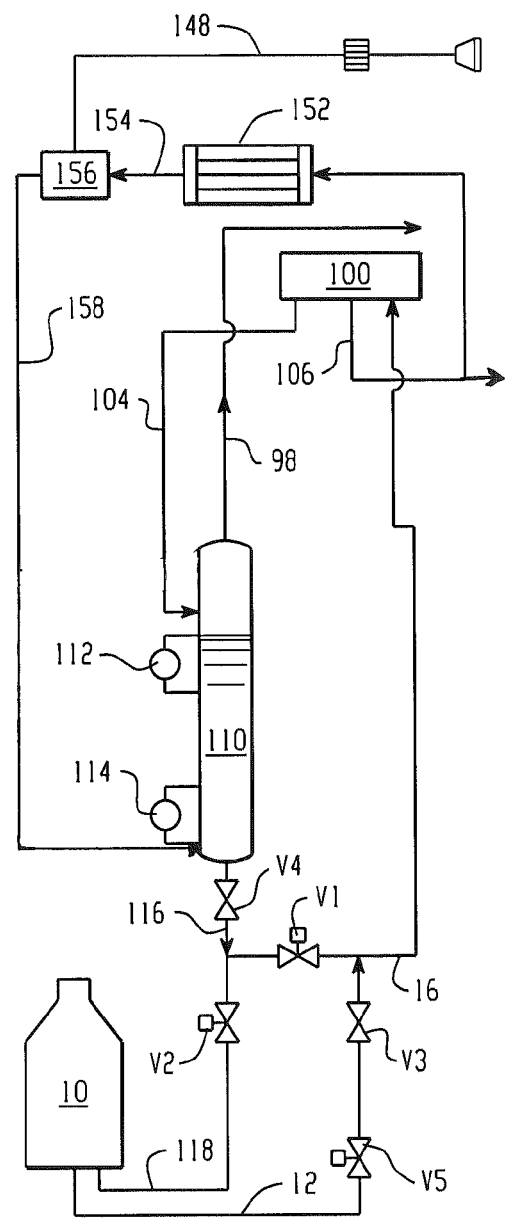

Overall: $CH_3OH + H_2O > 3H_2 + CO_2$;

where the standard electrical potential)(E° that is used to carry out the reaction is −0.016 Volts SPE (Standard Hydrogen Electrode). Methanol carbon dioxide stream 104 can be directed from the electrolyzer to base methanol reservoir 110. Hydrogen stream 106 can also be directed to base methanol reservoir 110 as is illustrated in FIG. 1, hydrogen stream 106 can be removed as a product hydrogen stream (for example, for use in an engine where carbon dioxide mixed with hydrogen is tolerable), or hydrogen stream 106 can be directed to electrolyzer stream condenser 152 as is illustrated in FIG. 2. In applications, where a higher purity hydrogen is desirable (for example, when using the hydrogen for industrial purposes or for use in a hydrogen fuel cell), then the embodiment illustrated in FIG. 2 can be preferable, where hydrogen stream 106 is not directed to base methanol reservoir 110, as there is a reduced opportunity for carbon dioxide or other contaminants to enter the hydrogen product stream. Hydrogen stream 106 can comprise 5 to 100 wt % hydrogen depending on whether or not water is passing through the electrolyzer membrane. Hydrogen stream 106 can further comprise one or both of water and methanol.

Figure 4:
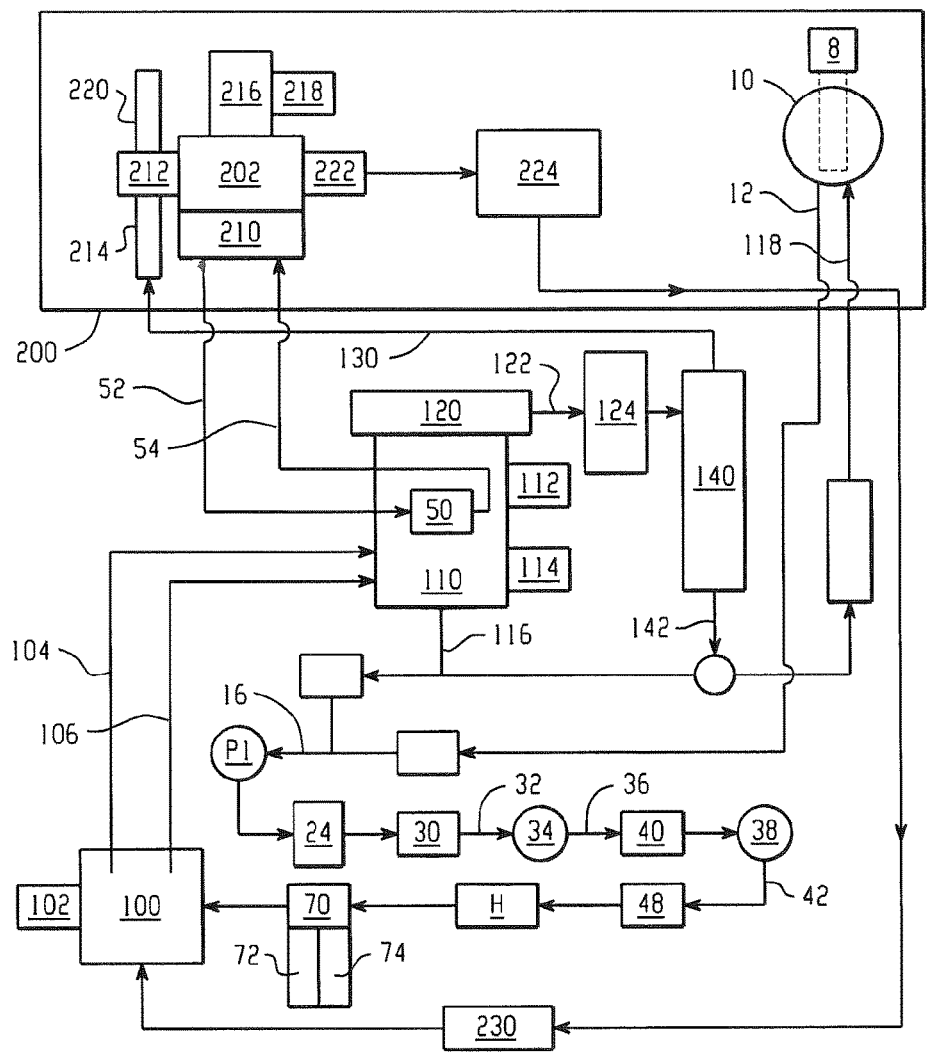
FIG. 4 is an illustration of an embodiment of a block diagram for the hydrogen production system and vehicle domain 200.

When hydrogen stream 106 is directed to base methanol reservoir 110, reservoir outlet stream 98 that is withdrawn from base methanol reservoir 110 can be used as a product hydrogen stream (for example, for use in an engine) or it can be directed to optional reservoir stream condenser 120. Optional reservoir stream condenser 120 condenses the methanol and water, separating them from the hydrogen and carbon dioxide gases to result in condensed electrolyzer stream 122. If reservoir stream condenser 120 is not present, then reservoir outlet stream 98 can be directed to reservoir liquid separator 126. Condensed reservoir stream 122 can be directed to reservoir liquid separator 126 that can separate the hydrogen and carbon dioxide gases forming reservoir hydrogen product stream 130 and the liquid methanol and water forming separated reservoir stream 128. Temperature sensor 124 can be used to measure the temperature of condensed reservoir stream 122. Separated reservoir stream 128 can comprise 5 to 90 wt % of methanol based on the total weight of the separated reservoir stream 128. Reservoir hydrogen product stream 130 can be used, for example, in an engine or can be further purified for use in a fuel cell. Separated reservoir stream 128 can be directed to base methanol reservoir 110 below low liquid level sensor 114. Separated reservoir stream 128 can be directed to reservoir condenser tank 140, which can be in fluid communication with the methanol loop via reservoir recycle stream 142. FIG. 4 illustrates that a manifold (as illustrated by the circle under reservoir condenser tank 140) can be used to regulate a fluid flow from reservoir condenser tank 140 and that solenoid valve(s) (as illustrated by the rectangle under source methanol reservoir 10 and the rectangle downstream of the manifold) and a check valve as illustrated by the box upstream of pump P1 and downstream of source methanol reservoir 10) can control the flow of both circulated stream 116 and reservoir recycle stream 142 to the methanol loop.

When hydrogen stream 106 is directed to electrolyzer stream condenser 152, reservoir outlet stream 98 that is withdrawn from base methanol reservoir 110 can be directed out to the atmosphere or can be purified to recover methanol and water to be added back to the methanol loop. Hydrogen stream 106 can be used as a product hydrogen stream (for example, for use in an engine, fuel cell or storage) or it can be directed to optional electrolyzer stream condenser 152. Optional electrolyzer stream condenser 152 condenses the methanol and water, separating them from the hydrogen gas to result in condensed electrolyzer stream 154. A temperature sensor can be used to measure the temperature of condensed electrolyzer stream 154. If electrolyzer stream condenser 152 is not present, then hydrogen stream 106 can be directed to electrolyzer liquid separator 156. Condensed electrolyzer stream 154 can be directed to electrolyzer liquid separator 156 that can separate the hydrogen gas forming electrolyzer hydrogen product stream 148, and the liquid methanol and water forming separated electrolyzer stream 158. Separated electrolyzer stream 158 can comprise 5 to 90 wt % of methanol based on the total weight of the separated electrolyzer stream 158. Electrolyzer hydrogen product stream 148 can comprise 5 to 100 wt % hydrogen based on the total weight of electrolyzer hydrogen product stream 148. Electrolyzer hydrogen product stream 148 can be used, for example, in an engine, in a fuel cell, or in a process that relies on purified hydrogen. Separated electrolyzer stream 158 can be directed to base methanol reservoir 110 below the low liquid level indicated by low liquid level sensor 114. Separated electrolyzer stream 158 can be directed to electrolyzer condenser tank 160, which can be in fluid communication with the methanol loop via electrolyzer recycle stream 162. Similar to FIG. 4, a manifold can be used to regulate a fluid flow from electrolyzer condenser tank 160 and a solenoid valve can control the flow the both circulated stream 116 and electrolyzer recycle stream 162 to the methanol loop.

The condensers such as reservoir stream condenser 120 and electrolyzer stream condenser 152 can condense the methanol and water vapor.

A flashback arrestor, check valve, and thermal shutoff valve can be located on a product hydrogen stream (such as reservoir outlet stream 98, hydrogen stream 106, reservoir hydrogen product stream 130, or electrolyzer hydrogen product stream 148) that can arrest a combustion propagation of the hydrogen gas to the methanol loop in the event that an ignition has occurred. A back pressure valve can be located on a product hydrogen stream, such as on reservoir outlet stream 98 (for example, when hydrogen stream 106 is added to base methanol reservoir), hydrogen stream 106, reservoir hydrogen product stream 130, or electrolyzer hydrogen product stream 148. The back pressure valve can pressurize the hydrogen production system and can result in a pressurized hydrogen stream added to the engine. A pressurized hydrogen production system can result in an increased condenser efficiency in condensing one or both of the methanol and the water as compared to a condenser efficiency of an unpressurized hydrogen production system operating at the same operating conditions. Furthermore, a pressurized hydrogen production system can reduce the amount of one or both of methanol and water from vaporizing in the methanol loop. The increased pressure of a pressurized hydrogen stream can facilitate the addition of a pressurized hydrogen stream into the pressurized combustion air downstream of the engine turbocharger. The back pressure valve can increase the pressure of the hydrogen production system to a pressure of 80 kPa to 70 mega pascal (MPa).

The system can maintain one or both of a methanol concentration of the methanol in the methanol loop and a fluid level in base methanol reservoir 110 by controlling a flow of the feed mixture from source methanol reservoir 10 and a flow of purge stream 118 from methanol loop, for example, from base methanol reservoir 110 back into source methanol reservoir 10. While it is illustrated that the purge stream 118 is withdrawn directly from base methanol reservoir 110, other withdrawing locations can be used.

For example, if the methanol concentration of the methanol in the methanol loop is low or if a fluid level in base methanol reservoir 110 is low, then valve V5 can be opened to allow methanol feed stream 12 to flow from the source methanol reservoir 10 into the loop and valve V2 can be opened or closed depending on the levels and relative flow rates of the streams to, for example, maintain fluid level in base methanol reservoir 110 while adding methanol of higher concentration to the methanol loop from source methanol reservoir 10. Conversely, if a fluid level in base methanol reservoir 110 is high, then valve V2 can be opened to allow purge stream 118 to flow from the methanol loop into source methanol reservoir 10. Liquid level in base methanol reservoir 100 can be determined by one or both of low liquid level sensor 114 and high liquid level sensor 112. Optionally, one of more of power valve V1 and check valves V3, V4 can be present to help monitor the flow through the system. It is noted that one or more of the valves can be opened or closed to varying degrees to control a flow rate to the valve and it will be understood that opening a valve can mean increasing a flow through the valve and that closing the valve can mean reducing the flow through the valve, i.e., so that there is not necessarily only an 'open' position and a 'closed' position.

The methanol concentration of the methanol in the methanol loop, for example, of the base methanol mixture can be maintained at 10 to 80 wt %, or 25 to 80 wt %, or 10 to 25 wt %, or 10 to 15 wt % methanol, based on a total weight of the base methanol mixture and an ambient temperature being greater than 0° C. The methanol concentration of the methanol in the methanol loop, for example, of the base methanol mixture can be maintained at 10 to 80 wt %, 25 to 80 wt %, or 10 to 65 wt %, or 10 to 45 wt % methanol, based on a total weight of the base methanol mixture and an ambient temperature being less than or equal to 0° C.

Figure 3:
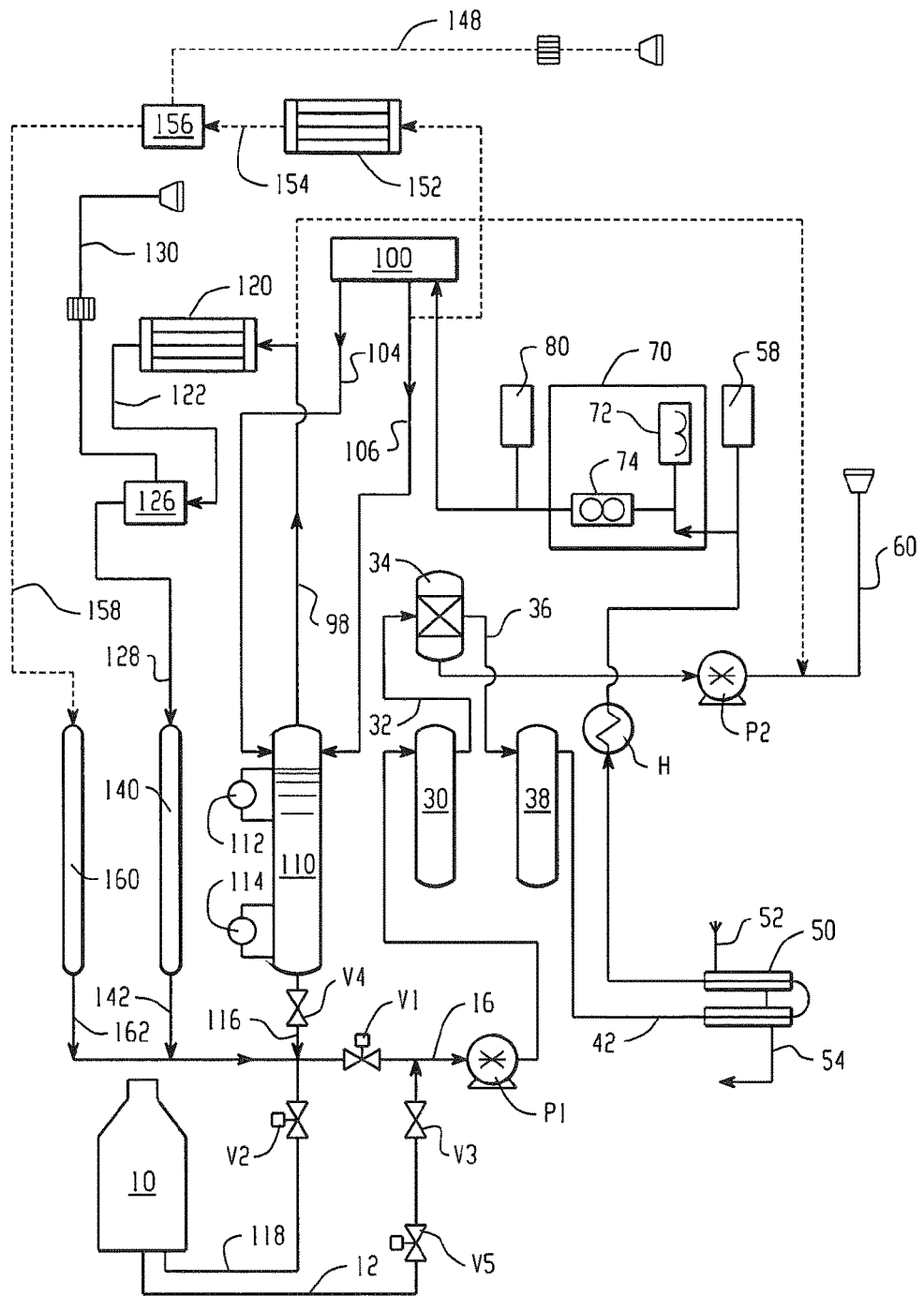

The methanol loop can further comprise a pump, a methanol concentration sensor, a methanol purification system, a heating system, or a combination comprising at least one of the foregoing. For example, FIG. 3 illustrates the methanol loop comprises a methanol concentration sensor, such as liquid density sensor 70; a methanol purification system comprising particulate filter 30, membrane contactor 34, and deionizing filter 38; heat exchanger 50, electric heater H, and pressure sensors 58 and 80.

Electrolyzer inlet stream 16 can be pressurized via pump P1 upstream of electrolyzer 100. The pressurizing can increase the pressure of the electrolyzer inlet stream 16 to a pressure of 100 kPa to 70 MPa, or 100 kPa to 35 MPa. The pressurizing can comprise pressuring to a pressure of 100 kPa to 35 MPa, or 100 to 7,000 kPa. The pressure pump P1 can be capable of generating a pressure differential between pump inlet and pump outlet of 1 kPa to 70 MPa. Pump P1 can be controlled in various ways to maintain sufficient pressure for consistent flow through the methanol loop. For example, a method of achieving consistent flow is to control the pump with a closed-loop controller that can measure a pressure differential across a positive displacement pump or an orifice plate to estimate the liquid flow rate. The power of the pump can then be adjusted to maintain a differential pressure that ultimately can maintain a liquid flow rate at the desired rate. As used herein, maintaining a liquid flow rate at a rate at a desired rate can mean that the liquid flow rate is maintained within 20%, or within 10% of a set flow rate. Pump P1 can facilitate the flow of the methanol mixture through the methanol loop.

The loop can comprise a methanol concentration sensor. The methanol concentration sensor can be an electrochemical type sensor or the methanol concentration sensor can measure a physical phenomenon, for example, liquid density, or liquid capacitance, or gravimetric, to calculate the methanol concentration. The methanol sensor can be located on electrolyzer inlet stream 16, methanol carbon dioxide stream 104, circulated stream 116, base methanol reservoir 110, or a combination comprising at least one or more of the foregoing. The methanol concentration sensor can comprise liquid density sensor 70. Liquid density sensor 70 can comprise temperature sensor 72 and density sensor 74. The methanol concentration sensor can comprise an Integrated Sensing Systems Micro Methanol Concentration Sensor (uMCS). The methanol concentration sensor, such as the uMCS, can comprise a sensor orifice plate that can determine a flowrate through the sensor. The flowrate of the methanol loop can be determined by measuring a pressure differential across a sensor orifice plate, which can comprise a sensor orifice with a diameter of 0.1 to 1 millimeters (mm). The pressure differential can be determined by two internal pressure transducers located on either side of the sensor orifice or can be determined by a single pressure transducer capable of measuring differential pressure.

The methanol purification system can be located on electrolyzer inlet stream 16, methanol carbon dioxide stream 104, circulated stream 116, base methanol reservoir 110, or a combination comprising at least one or more of the foregoing. The methanol purification system can comprise particulate filter 30 and deionizing filter 38. Particulate filter 30 can remove particulates, such as sediment, from methanol mixture. Particulate filter 30 can remove particulates with a length scale of greater than or equal to 0.1 micrometer, or greater than or equal to 1 micrometer. The filter can remove the particulates to reduce and prevent damage of sensitive components, such as the electrolyzer membrane. Particulate filter 30 can comprise a pressure sensor than can measure a differential pressure across the filter. This pressure measurement can indicate a sediment load of the filter, which can be compared to the differential pressure of a fully loaded filter, signifying when the filter is to be changed.

Deionizing filter 38 can remove ions from the methanol mixture that can otherwise result in degradation of proton conductivity of the exchange membrane. Deionizing filter 38 can replace 50 to 100% of harmful cations with hydrogen cations and can optionally replace 50 to 100% of anions with one or both of hydroxide and bicarbonate. Particulate filter 30 can be located upstream or downstream of deionizing filter 38.

The methanol purification system can comprise membrane contactor 34. Membrane contactor 34 can be located downstream of particulate filter 30 and upstream of deionizing filter 38. Membrane contactor 34 can remove carbon dioxide or other dissolved gases from the methanol mixture. Membrane contactor 34 can comprise a hydrophobic membrane that draws the carbon dioxide out of the methanol mixture and an anion and cation exchange resin to remove ionic impurities from the methanol mixture. Alternatively, the cation exchange resin can be located upstream of membrane contactor 34 and the anion exchange membrane can be located downstream of membrane contactor 34. The cation exchange resin can remove positively charged ions and can result in a drop in pH, for example, to a pH of less than or equal to 5, or less than or equal to 4.5 allowing for the carbon dioxide to be removed from the solution as a gas. The anion exchange resin can then further remove negatively charged ions, such as formic acid produced by the partial oxidation of methanol from the methanol mixture, resulting in an increase in the pH to 2 to 9. Deionizing filter 38 can be located downstream of particulate filter 30 in the absence of membrane contactor 34 to remove negatively and positively charged ions.

The reduction of carbon dioxide in the methanol mixture that can be produced by the reaction of methanol and water, which can result in an improvement in one or both the performance and lifetime of the exchange membrane. The presence of carbon dioxide in the methanol mixture can further be deleterious as the carbon dioxide can form carbonic acid in the methanol mixture. The carbonic acid can reduce the pH of the methanol mixture, for example, to a value of 1.5 to 4 pH, which can accelerate the corrosion of one or more of the materials of construction of the system, which can comprise, for example, stainless steel. The accelerated corrosion can further result in an increase in metal ions from the system that further can be removed.

One or both of a pH sensor and an electrical conductivity sensor can be located downstream of membrane contactor 34. An electrical conductivity can be 0.2 to 5 megaohms per cubic centimeter (MOhm/cm$^2$). A pH of the methanol mixture can be 1.5 to 9. Vapor stream 60 can be removed from membrane contactor 34 via pump P2. Pump P2 can maintain an absolute pressure of 1 to 20 kPa in membrane contactor 34 such that dissolved gasses from the methanol mixture can be removed. Vapor stream 60 can comprise methanol and water vapor that can be exhausted to the atmosphere or that can be passed through reservoir stream condenser 120 or electrolyzer stream condenser 152.

FIGS. 3 and 4 illustrate that electrolyzer inlet stream 16 can be directed to particulate filter 30 to produce first filtered stream 32. First filtered stream 32 can be directed to membrane contactor 34 to form contacted stream 36. Contacted stream 36 can be directed to deionizing filter 38. It will be appreciated that first filtered stream 32 could be added directly to deionizing filter 38 in the absence of membrane contactor 34. FIG. 4 illustrates that pH probe 40 can be located on contacted stream 36 to determine the pH of the stream exiting membrane contactor 34. It will be appreciated that at least two of particulate filter 30, membrane contactor 34, and deionizing filter 38 can be combined into one filter.

The hydrogen production system can comprise a heating system comprising one or both of a heat exchanger and an electrical heater. The heating system can be used to adjust a temperature of the methanol mixture in the methanol loop. For example, as the methanol concentration in the methanol mixture decreases, then the heating system can increase a temperature of the methanol mixture and as the methanol concentration in the methanol mixture increases, the heating system can reduce heating to the methanol mixture to decrease its temperature. A temperature set point of the methanol mixture can be determined by measuring the actual temperature of the methanol mixture, determining the actual concentration of the methanol mixture, and adjusting the temperature set point based on the actual temperature, the actual concentration, and a lookup table comprising correlated data between temperature values, concentration values, and temperature and methanol concentration dependent membrane deterioration information.

The heat exchanger can heat electrolyzer inlet stream 16, methanol carbon dioxide stream 104, circulated stream 116, base methanol reservoir 110, electrolyzer 100, or a combination comprising at least one or more of the foregoing. Heat from an engine can be used to heat the heat exchanger. For example, FIG. 3 illustrates that heat exchanger 50 can be used to heat electrolyzer inlet stream 16 and FIG. 4 illustrates that heat exchanger 50 can be used to heat base methanol reservoir 110. The heat used to heat the methanol loop can be supplied from an engine. For example, heat from engine cooling supply stream 52 can be used to provide heat to the heat exchanger to result in engine cooling return stream 54 that can be directed back to the engine. Depending on the ambient temperature, the engine cooling supply stream 52 temperature, the methanol loop temperature, the methanol loop flow rate, and the insulation quantity, the heating energy can be 10 joules (J) to 10,000 kilojoules (kJ). Based on a desired heat input to the methanol mixture, a variable valve can be used to control the flow rate of the methanol mixture entering the heat exchanger and a flow rate of a bypass stream that can bypasses the heat exchanger through a separate bypass line before recombining for entry to electrolyzer 100. Based on a desired heat input to the methanol mixture, a variable valve can be used to control the flow rate of one or both of engine cooling supply stream 52 and engine cooling return stream 54.

The electrical heater can heat electrolyzer inlet stream 16, methanol carbon dioxide stream 104, circulated stream 116, base methanol reservoir 110, electrolyzer 100, or a combination comprising at least one or more of the foregoing. The electrical heater can be present to supply heat to the methanol loop. The electrical heater can be present in addition to the heat exchanger, for example, to supply an additional heat to the methanol loop in addition to the heat supplied from the heat exchanger or to supply heat to the methanol loop when heat from the heat exchanger is not added.

The electrical heater can comprise an electric heating element that is attached to the heat exchanger to transfer heat from the electric heating element to the methanol mixture. When the heat exchanger bypass is fully closed, all of the methanol mixture can flow through the heat exchanger and an electrical current can be applied to the heating element of the electrical heater. The electrical current can be varied to maintain a desired temperature of the methanol mixture. When the actual temperature of the methanol mixture begins to surpass the desired level, indicating the heat exchanger is providing a sufficient amount heat, one or both of the electrical current to the heating element of the electrical heater can be reduced and the bypass valve can be opened.

Figure 5:
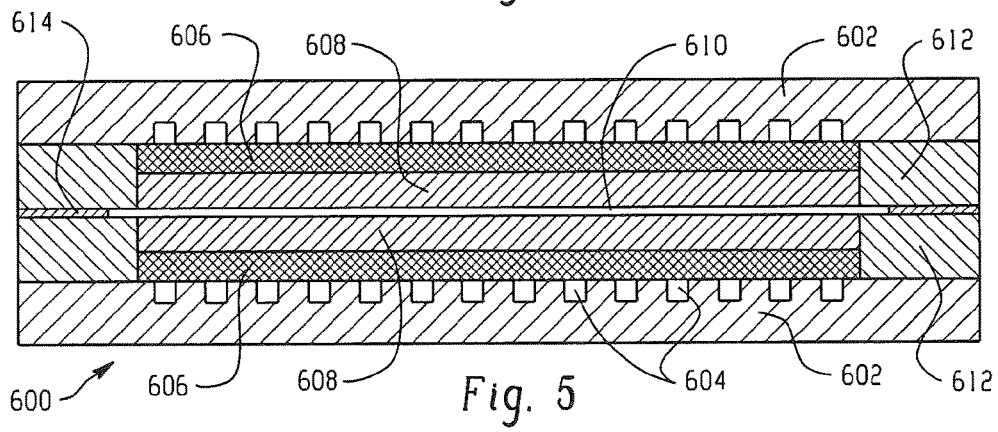
FIG. 5 is an illustration of an embodiment of an electrolyzes cell assembly.

The electrolyzer can comprise an electrolyzer cell assembly comprising an exchange membrane located in between an anode and a cathode; a system configured to provide an organic fuel to the anode; and a cathode chamber located on a cathode side of the exchange membrane and configured to collect a hydrogen gas generated from electrolysis of the methanol; and a power supply (such as a DC-DC converter, AC-DC converter or battery) connected to the anode and the cathode. An example of an electrolyzer cell assembly is illustrated in FIG. 5. FIG. 5 illustrates that electrolyzer cell assembly 600 can comprise an exchange membrane 610 disposed between an anode and a cathode. Anode support screen 606 can be disposed on an anode side of exchange membrane 610 and cathode support screen 606 disposed on a cathode side of the exchange membrane 610. Anode side diffusion layer 608 can be disposed on the anode side of exchange membrane 610 and between the anode support screen 606 and exchange membrane 610. Cathode diffusion layer 608 can be disposed on the cathode side of exchange membrane 610 and between cathode support screen 606 and exchange membrane 610. Anode flow field 602 can be disposed on the anode side of exchange membrane 610 and cathode flow field 602 disposed on the cathode side of exchange membrane 610. Anode flow field 602 and cathode flow field 602 can each comprise a plurality of flow channels.

In the electrolyzer cell, the methanol mixture provides the fuel (methanol and optionally water) and the oxidant (for example, oxygen in water) to produce hydrogen and carbon dioxide. A methanol carbon dioxide stream is removed through the flow channels on the anode side of the exchange membrane and hydrogen ions and electrons diffuse through the exchange membrane and combine on the cathode to form hydrogen gas that can then flow out through the cathode side flow channels. The methanol carbon dioxide stream can comprise carbon dioxide gas that can flow into the base methanol reservoir.

The electrolyzer comprises an exchange membrane. The exchange membrane can comprise a co-polymer of tetrafluoroethylene and perfluorovinylether sulfonic acid (such a NAFION membrane, commercially available from DuPont), a perfluorinated sulfonic acid polymer (such as ACIPLEX™, commercially available from Asahi Glass Co., Japan), a polyethylene and polypropylene sulfonic acid membrane, a polystyrene-polyhydrocarbon sulfonic acid membrane (such as those commercially available from RAI Corporation, USA), poly(vinylidene fluoride), a non-flourinated hydrocarbon ionomer membrane (such as FUMAPEM™ P, E, or K commercially available from FuMA-Tech mbH, Germany), or a combination comprising at least one of the foregoing. The polymeric material can comprise, for example, a co-polymer of tetrafluoroethylene and perfluorovinylether sulfonic acid. If sulfuric acid is present in the exchange membrane, the exchange membrane can be washed, for example, in deionized water at a temperature of 90 to 100° C. prior to using. The exchange membrane can have a thickness of 25 to 250 micrometers. The thickness of the exchange membrane can be thicker, for example, 150 to 250 micrometers if a higher temperature (for example, of greater than or equal 80° C. is used) and/or a higher methanol concentration (for example, greater than or equal to 50 wt % methanol) is used or thinner, for example, of 25 to 120, or 40 to 60 micrometers if a higher efficiency is desired.

Optional anode gas diffusion layer and a cathode gas diffusion layer 608 can be located on an anode side and a cathode side of exchange membrane 610, respectively. Gas diffusion layer 608 can comprise a carbon fiber backing sheet that can be used to facilitate electrical contact with the catalyst. The carbon fiber backing sheet can comprise one or both of a carbon papers (e.g., TORAY™ paper, AVCARB™ MGL, and AVCARB™ EP) and a carbon cloth (e.g., AVCARB™ HCB and FUELCELLSETC™ GDL-CT). One or both of gas diffusion layers 608 can be affixed to exchange membrane 610 by hot pressing. Alternatively a catalyst can be applied directly to the exchange membrane by spraying, by brushing, or by hot pressing a prepared catalyst layer. The hot pressing can be performed at 80 to 180° C., or 100 to 180° C., or 120 to 160° C. for 1 to 120 minutes (min), or 1 to 60 min, or 5 to 60 min. Catalyst coated paper backings, cloth backings, and complete membrane electrode assemblies are available from FUELCELLSETC™, of College Station, Tex.

The electrolyzes can utilize a catalyst to facilitate the methanol reaction. The catalyst can be present in the exchange membrane, can be associated with one or both of the anode and the cathode side of the exchange membrane, can be associated with one or both of gas diffusion layers 608, or a combination comprising at least one of the foregoing. The catalyst can be present in an amount of 0.1 to 8 milligrams per centimeters squared (mg/cm$^2$), or 0.5 to 4 mg/cm$^2$, or 1 to 6 mg/cm$^2$, or 0.1 to 1 mg/cm$^2$. The catalyst can comprise platinum, ruthenium, tin, iridium, osmium, rhenium, palladium, tungsten, rhodium, iron, cobalt, nickel, molybdenum, niobium, zirconium, titanium, or a combination comprising at least one of the foregoing. The catalyst can comprise one or both of an anode catalyst and a cathode catalyst. The anode catalyst can comprise platinum and ruthenium, for example, as an alloy and/or as separate platinum particles and ruthenium particles. A weight ratio of platinum to ruthenium can be 40:60 to 100:0, or 55:45 to 95:5. The cathode catalyst can comprise, for example, unsupported platinum or platinum supported by carbon with a weight ratio of platinum to carbon of 5:95 to 95:5, or 20:80 to 80:20, or 50:50 to 70:30.

The catalyst can be supported on a support material such as a high surface area carbon such as Vulcan XC-72A from Cabot Inc., USA, or a high surface area metallic oxide. The catalyst can comprise an unsupported catalyst, a supported catalyst, or a combination comprising at least one of the foregoing. The catalyst can comprise a material that can improve the electrolysis efficiency, including titanium dioxide ($TiO_2$), ruthenium, rhodium, iridium, osmium, or a combination comprising at least one of the foregoing.

It was surprisingly discovered that when support screen 606 is disposed on one or both of an anode side and a cathode side of the exchange membrane an improved electrical conductivity across the electrolyzer cell assembly is achieved as compared to the same electrolyzer cell assembly but that does not comprise support screen 606. Without being bound by theory, it is believed that this improvement arises due to an improved pressure distribution across the gas diffusion layers 608 or exchange membrane 610 when support screen 606 is present. For example, when the support screen(s) is not present, methanol introduction to the exchange membrane results in uncontrolled swelling of the exchange membrane. As the flow field plates comprise flow channels, much of the swelling of the exchange membrane results in an increased swelling of the exchange membrane into the flow channels and can result in exchange membrane thinning in the raised sections of the flow channels or wrinkle formation in the gas diffusion layer(s), catalyst layer(s), or membrane in the recessed sections of the flow channels. Exchange membrane thinning can result in the formation of voids in the exchange membrane that can cause reactants and products to pass through the voids and/or can cause an anode catalyst to come into contact with a cathode catalyst, allowing electrons to bypass the exchange membrane and short-circuit the cell. Wrinkling can disadvantageously result in separation of the catalyst from the exchange membrane. The presence of the support screen(s) can help prevent the exchange membrane from swelling into the flow channels of the flow field plates, which can ultimately reduce exchange membrane thinning, wrinkle formation in one or more of the gas diffusion layer(s), the catalyst layer(s), and in the exchange membrane.

The support screen(s) can comprise a carbon, a metal, or a combination comprising at least one of the foregoing. The support screen(s) can be resistant to corrosion from the methanol mixture. The support screen(s) can comprise an expanded metal, a woven metal mesh, a perforated metal screen, a woven cloth, a non-woven cloth, or a combination comprising at least one of the foregoing provided that it can reduce swelling of the exchange membrane into the flow channels. The support screen(s) can comprise stainless steel (SS) (such as 304 or 316 grade), copper, aluminum, or titanium coated with a highly corrosion resistant and conductive material (such as platinum, ruthenium, iridium, gold, carbon, or a conductive polymer), or a combination comprising at least one of the foregoing. The support screen(s) can have a tensile strength of greater than or equal to 0.5 MPa, or greater than or equal to 1 MPa, or 1 to 4,000 MPa or a flexural strength of greater than or equal to 10 MPa, or 20 to 8,000 MPa. The support screen can comprise 316 grade SS coated with gold.

The electrolyzer cell assembly can comprise seals 612. The seals can comprise polytetrafluoroethylene. The seals can help to control the compressed thickness of the gas diffusion layers and can help to provide optimal contact pressure between all layers of the electrolyzer cell assembly. The electrolyzer cell assembly can comprise membrane spacer seal 614 that can have the same height as the height of the exchange membrane to prevent the seals (612) from crushing the exchange membrane under compressive load.

The electrolyzer can comprise hydrogen pressure sensor 102. The electrolyzer can operate at a temperature of 5 to 220° C., or 5 to 120° C., or 20 to 100° C., or 20 to 80° C. The electrolyzer can operate at a temperature of 30 to 120° C., or 30 to 80° C. The electrolyzer can operate at a pressure of 1 kPa to 70 MPa, or 1 kPa to 35 MPa, or 100 to 7,500 kPa, or 100 to 3,500 kPa. The pressure difference between the anode and cathode sides of the exchange membrane can be 0 kPa to 70 MPa, or 0 to 35 MPa, or 0 to 7,500 kPa, or 0 to 3,500 kPa or 100 to 3,500 kPa. The electrolyzer can comprise hydrogen pressure sensor 102. Liquid can pass through each electrolyzer cell assembly 600 at a flow rate of 1 to 500 milliliters per minute (mL/min), or 5 to 500 mL/min, or 10 to 500 mL/min, or 5 to 250 mL/min.

It is noted that there is a balance between the electrolyzer temperature and the methanol concentration that should be considered when performing the present method as when one or both of the electrolyzer temperature and the methanol concentration is increased, the methanol solution can act like a solvent for the membrane and can result in a reduction in the mechanical integrity of the membrane and can slowly dissolve the proton conducting particles in the catalyst layer.

A hydrogen product stream, such as reservoir outlet stream 98 (for example, when hydrogen stream 106 is added to base methanol reservoir), electrolyzer hydrogen outlet stream 106, reservoir hydrogen product stream 130, or electrolyzer hydrogen product stream 148, produced in the methanol production system can be used in a combustion engine. The combustion engine is in a vehicle (such as a boat, a car, a truck, a motorcycle, an airplane, or a bus) or a machine (such as a construction machine, an electrical generator, or a mining machine).

FIG. 4 illustrates that the hydrogen produced in hydrogen production system can be injected to engine 202 via air intake 212 and hydrogen injector 214 and that mass air flow sensor 220 can determine the mass flow rate of the air to engine 202. Sensor 218 can determine one or both of the exhaust temperature and the oxygen concentration in exhaust 216 exiting engine 202.

The hydrogen injector can be active, for example, an electronic solenoid valve, or passive, for example, a fixed size orifice. The hydrogen injector can be located at any suitable location in the air intake system, specifically, it can be located downstream of a turbocharger or throttle body. The hydrogen injector can be located upstream of a turbocharger or throttle body close to an engine air intake manifold but care must be taken to allow sufficient distance to establish a homogenous mixture of hydrogen and air before the mixture enters the combustion chamber. By controlling a period of time the hydrogen injector is open over a specific time period (duty cycle), the flow rate of hydrogen into the engine can be controlled. Mass flow characteristics of hydrogen fuel injectors are typically characterized using a standard differential pressure and gas at standard conditions. The fuel injector characterization can be used as a basis to generate a map (injector flow map) of differential pressures and mass gas flow rates to injector duty cycles which, can be used by software to control a mass flow rate. The mapping can be based on standard conditions so that gas density, calculated with gas pressure and temperature, can be accounted for. The control software can measure the pressure and temperature to determine the density of the gas flowing to the injector. In this configuration, pressure upstream of the injector can be varied to maintain a constant differential pressure across the injector or a pressure can be varied to maintain a constant upstream pressure. In the case of constant differential pressure across the injector, compensation can be simpler as the differential pressure in the injector flow map can be set to the same pressure that is being maintained across the injector. Alternately, if constant pressure upstream of the injector is used, the control software can compensate by opening the injector for more or less time depending on whether differential pressure is respectively lower or higher across the injector.

In either case, the injection point can be located upstream of a mass air flow measurement point so that the hydrogen flow does not affect the mass air flow measurement. If the hydrogen product stream being injected via the hydrogen injector comprises carbon dioxide, then the presence of the carbon dioxide in the stream can be accounted for to yield the total flow rate required to achieve the desired hydrogen flow rate, for example, by adding the desired hydrogen flow rate to the calculated carbon dioxide flow rate based on an assumed 3:1 molar ratio of hydrogen to carbon dioxide. For example, in a scenario where 5 standard liters per minute (SLPM) of hydrogen, which corresponds to a flow rate of 0.445 grams per minute (g/min) of hydrogen, are desired, then 3.232 g/min of a hydrogen product stream can be added, resulting in the desired 0.445 g/min of hydrogen and the excess comprising carbon dioxide present in the stream. In a similar scenario, for example, where 5 standard liters per minute (SLPM) of hydrogen are desired, but where carbon dioxide is not present in the hydrogen product stream, 0.445 g/min of hydrogen can be injected without accounting for carbon dioxide (for example, when the hydrogen product stream comprises reservoir outlet stream 98 or reservoir hydrogen product stream 130.

The hydrogen injector, for example, having a fixed size orifice, can be located upstream of the turbocharger. When an increase in hydrogen flow is desired, the differential pressure across the orifice can be increased by increasing an electrical current to the electrolyzer causing more hydrogen to be produced causing an increase in the pre-orifice pressure. The mass flow of the hydrogen can correspond to the volume flow multiplied by hydrogen density, which can be calculated using the pressure and temperature of the gas. This technique can allow for hydrogen to be injected into pressurized combustion air, located upstream of the turbocharger. Air pressure upstream of the turbocharger can constantly change with engine load and the delay can be reduced due to the closed-loop pressure controller increasing the electrical current of the electrolyzer. The increase in electrical current can fill the tubing with hydrogen causing the pre-orifice pressure to rise to a pressure of 100 to 3,000 kPa.

The system provides three alternatives for controlling the flow rate of hydrogen introduced into the engine combustion air, depending on the injection location and the desired response time of hydrogen delivery to the engine. The first alternative is connecting the hydrogen gas outlet of the hydrogen production system to the air intake system of the engine. The flow rate of hydrogen delivered to the combustion air can then be dependent on the electrical current input to the electrolyzer. It was experimentally determined that 0.0005 to 0.0008 grams (g) of hydrogen can be produced per amp per electrolytic cell, which can provide a basis for calculating a quantity of electrical current to satisfy a hydrogen mass flow demand. This approach can experience a delay between a measured change in engine demand and an actual change in hydrogen concentration in the combustion air. The electrolyzer response to a change in electrical current can be rapid, but a change in flow rate at the injection site is generally not immediate due to the length of tubing between the hydrogen production system and the engine; where a longer connection or a larger diameter tube causes a longer delay. Smaller diameter tubing has been shown to improve response time. The alternative control techniques can rely on the electrolyzer to maintain a constant pressure differential across an orifice to control the flow rate. In this arrangement, a closed-loop controller can be used to vary the electrical current applied to the electrolyzer, proportionally changing the hydrogen flow rate, to maintain the desired orifice pressure differential.

FIG. 5 illustrates that product hydrogen stream 264 that can comprise reservoir outlet stream 98, hydrogen stream 106, reservoir hydrogen product stream 130, or electrolyzer hydrogen product stream 148 produced in electrolyzer 100 can pass through orifice 206 in hydrogen injector 214. Product hydrogen stream 264 can be pressurized, for example, by increasing the electrical current to electrolyzer 100 or through the presence of a back-pressure regulator. Product hydrogen stream 264 can have a pressure of 80 to 3,000 kPa. The product hydrogen can be combined with filtered air 280 from turbocharger compressor 282 in air intake tube 212 to form a hydrogen air mixture that can be directed to intake manifold 286. The hydrogen air mixture can comprise less than or equal to 5 vol %, or less than or equal to 4 vol %, or 0.0001 to 5 vol %, or 0.0001 to 3 vol % hydrogen based on the total volume of the hydrogen air mixture. The hydrogen air mixture can have a pressure of 80 to 1,000 kPa absolute before entering the combustion chamber. Mass air flow sensor 220 can monitor the mass air flow of the air in air intake tube 212. Differential pressure sensor 270 can monitor a differential pressure by comparing the pressure of product hydrogen stream 264, for example, with pressure input 272 located upstream of orifice 206 and the pressure of air hydrogen mixture in air intake tube 212, for example, via pressure input 274 located downstream of orifice 206. Differential pressure sensor 270 can provide the measured differential pressure to controlled loop controller 260. Hydrogen mass flow demand 250 can be used to determine pressure set point 252. Based on pressure set point 252 and differential pressure sensor 270, controller loop controller 260 can adjust a power via power controller 230.

Heat from the engine can be transferred to the hydrogen production system. For example, FIGS. 3 and 4 illustrate that engine cooling supply stream 52 can be directed from engine cooling system 210 to heat exchanger 50 to result in engine cooling return stream 54. Engine cooling supply stream 54 can be directed back to engine 202. Likewise, the electrical system of the engine can power the electrolyzer, where FIG. 4 illustrates that alternator 22 can supply an electrical energy to battery 224 and the electrical energy can be used to power electrolyzer 100 after being converted in one or more DC-to-DC converter(s) 230 if desired. The charging system of the engine can maintain the battery system of the engine, which can provide a buffer of energy for peak loads greater than a rating of the alternator. In some situations, the demand on electrical power of the electrolyzer can exceed that which is available from the alternator, but these situations can persist for short amounts of time when the engine load is high causing an increased demand on the hydrogen.

For example, the engine exhaust can be passed through an array of thermoelectric generators (TEG). The TEG array can generate electricity when a temperature difference across them is provided. The hot-side of the TEG array can be connected to a heat transfer liquid, which can be heated by the surplus heat by a liquid-to-solid heat exchanger (such as a cold plate heat exchanger). The cold-side of the TEG array can be cooled, which can be achieved by one or more of a dedicated liquid cooling system, a forced-air heatsink, and the engine cooling system. DC-to-DC conversion can be used to convert the electrical energy generated by the TEG array to a voltage and current compatible with the engine's electrical charging system.

Further to the integrated engine design, the inventors hereof also developed a computer system to control the amount of hydrogen from the hydrogen production system that is added to the engine and a computer system to control one or both of a methanol concentration in the methanol loop and a methanol level in the base methanol reservoir. The system is capable of using engine parameters to understand power demand and to match the hydrogen flow to power demand. Prior to the present system, a method of adding a hydrogen stream to an engine in a controlled fashion has not been realized.

The system can take advantage of data provided by an engine monitoring system by applying the obtained data to determine a hydrogen flow rate. Such data can be provided from a J1587 digital diagnostic bus or J1939 digital diagnostic bus, both of which continuously output fuel rate, revolutions per minute (rpm), boost pressure, and air intake temperature as standard parameters. The estimated mass air flow can be determined by determining the air density based on the boost pressure and the air intake temperature; determining a volume air flow rate based on the rpm, the engine displacement, and the volumetric efficiency; and determining the mass air flow by multiplying the volume air flow rate and the air density. The mass fuel rate is determined based on the fuel rate parameter and the standardized density of the fuel. The mass air flow and the air to fuel ratio is experimentally correlated to an optimal quantity of hydrogen for a particular engine.

The systems and methods described herein can be implemented in hardware, software (e.g., firmware), or a combination thereof. The methods described can be implemented, at least in part, in hardware and can be part of a microprocessor of a special or general-purpose computer system, such as a personal computer, workstation, minicomputer, or mainframe computer. For example, a computer system for implementing one or more the control methods can comprise a processor, a memory coupled to a memory controller, one or more input devices, and one or more output devices. One or both of the input and output devices can be peripherals that are communicatively coupled via a local input/output (I/O) controller. The output devices can control, for example, a flow rate adjuster, a heat exchanger, an electrical heater, a valve, or a combination comprising at least one of the foregoing. The input devices can include, for example, a lookup table, a pH sensor, a mass flow sensor, a temperature sensor, a density sensor, or a combination comprising at least one of the foregoing. The I/O controller can be, for example, one or more buses or other wired or wireless connections. The I/O controller can have additional elements, which are omitted for simplicity, such as controllers, buffers (caches), drivers, repeaters, and receivers, to enable communications. The I/O devices can further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor is a hardware device for executing hardware instructions or software, particularly those stored in the memory. The processor can be a custom made or commercially available processor, a central processing unit (CPU), an auxiliary processor among several processors associated with the computer system, a semiconductor based microprocessor (in the form of a microchip or chip set), a macroprocessor, or other device for executing instructions. The processor can include a cache, which can include, but is not limited to, an instruction cache to speed up executable instruction fetch, a data cache to speed up data fetch and store, and a translation lookaside buffer (TLB) used to speed up virtual-to-physical address translation for both executable instructions and data. The cache ZZ70 can be organized as a hierarchy of more cache levels (L1, L2, etc.).

The memory can include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory can incorporate electronic, magnetic, optical, or other types of storage media. Note that the memory can have a distributed architecture, where various components are situated remote from one another but can be accessed by the processor.

The instructions in memory can include one or more separate programs, each of which comprises an ordered listing of executable instructions for implementing logical functions. The operating system can control the execution of other computer programs and provide scheduling, input-output control, file and data management, memory management, and communication control and related services.

Additional data, including, for example, instructions for the processor or other retrievable information, can be stored in storage, which can be a storage device such as a hard disk drive or solid state drive. The stored instructions in the memory or in the storage can include those enabling the processor to execute one or more aspects of the systems and methods of this disclosure.

The computer system can further include a display controller coupled to a display. The computer system 42 can further include a network interface for coupling to a network. The network can be an IP-based network for communication between the computer system and an external server, client and the like via a broadband connection. The network can transmit and receive data between the computer system and external systems. The network can be implemented in a wireless fashion, e.g., using wireless protocols and technologies, such as WiFi, WiMax, etc. The network can also be a packet-switched network such as a local area network, wide area network, metropolitan area network, the Internet, or other similar type of network environment. The network can be a fixed wireless network, a wireless local area network (LAN), a wireless wide area network (WAN) a personal area network (PAN), a virtual private network (VPN), intranet or other suitable network system and can include device for receiving and transmitting signals.

Figure 6:
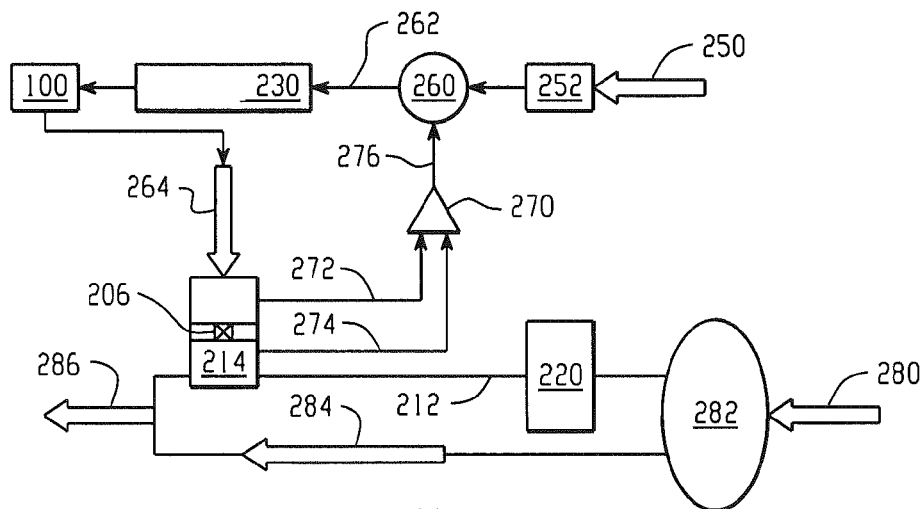
FIG. 6 is an illustration of an embodiment of a method of adding hydrogen to an air intake tube.
Figure 7:
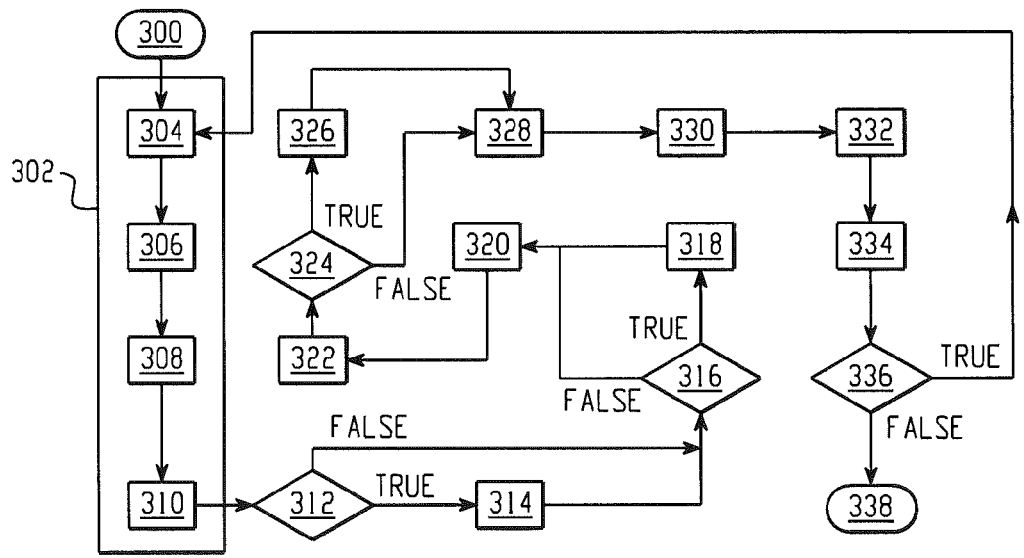
FIG. 7 is an illustration of an embodiment of a process for determining the amount of hydrogen for addition to an engine.

FIG. 7 is an illustration of an embodiment of a process for calculating the amount of hydrogen for addition to an engine that can ultimately result in a reduction in ignition delay in the engine. The process can start in oval 300 when the engine is started. Several engine parameters can be determined in step 302 including determining the mass air flow in block 304, determining an air to fuel ratio in block 306, determining an exhaust gas temperature in block 308, and determining an engine coolant temperature in block 310. The mass air flow can be retrieved from mass air flow sensor 220 flowing in direction 284, for example, as illustrated in FIG. 4 and FIG. 6. The air to fuel ratio can be determined by retrieving an oxygen percentage in the exhaust using sensor 218, for example, as illustrated in FIG. 4; and determining the air to fuel ratio based on the oxygen percentage. The air to fuel ratio can be determined via a wide band Lambda meter (such as ALM-LSU4.9D commercially available from Ecotrons ALM of Michigan) located in the exhaust stream of the engine. The exhaust gas temperature can be determined by retrieving temperature data from sensor 218, for example, see FIG. 4. The temperature data can be retrieved from a thermocouple, which can be desirably located as close to the exhaust port as possible, for example, in turbocharged engines, the thermocouple can be located upstream of a turbine of a turbocharger. The engine coolant temperature can be determined by retrieving temperature data from a sensor in the engine cooling system, for example, located in engine cooling system 210, for example, as illustrated in FIG. 4. The mass air flow, the air to fuel ratio, the exhaust gas temperature, and the engine coolant temperature can be determined in any order and can be determined just prior to the information being required by a query block.

Query block 312 can determine if the engine coolant temperature is high. For example, engine coolant temperature can be high if it is greater than or equal to a set engine coolant temperature. The set engine coolant temperature can be 70 to 140° C., for example, dependent on the engine manufacturer specifications. The set engine coolant temperature can be defined by a user or engine manufacturer.

When query block 312 returns a positive, then the process can comprise retrieving an engine coolant temperature correction factor in block 314. When query block 312 returns a negative, then the process can proceed.

Query block 316 can determine if the exhaust gas temperature is high. For example, exhaust gas temperature can be high if it is greater than or equal to a threshold exhaust gas temperature. The threshold exhaust gas temperature can be 550 to 800° C. The threshold exhaust gas temperature can be dependent on the engine manufacturer specifications. The threshold exhaust gas temperature can be defined by a user or engine manufacturer. When query block 316 returns a positive, then the process can comprise retrieving an exhaust gas temperature correction factor in block 318. When query block 316 returns a negative, then the process can proceed. The exhaust gas temperature correction factor can be used to reduce the amount of hydrogen injection into the engine if the exhaust gas temperature is greater than the threshold exhaust gas temperature to prevent damage to the engine.

Based on the mass air flow, a mass air flow rate of change can be determined in block 320. Based on mass air flow rate of change, the process can adjust the amount of hydrogen being injected into the engine based. Based on the determined mass air flow rate of change, the process can comprise retrieving a mass air flow rate of change correction factor in block 322. Query block 324 can determine if hydrogen is being injected into the engine. When query block 324 returns a positive, then the process can comprise modifying the air to fuel ratio to account for oxygen used to oxidize the hydrogen. When query block 324 returns a positive, then the process can proceed.

Block 328 can determine a fuel mass flow based on dividing the mass air flow by the air to fuel ratio. Block 330 can determine a baseline mass hydrogen flow based on the mass air flow and the air to fuel ratio. The baseline mass hydrogen flow is retrieved from a lookup table based on the actual mass air flow and the air to fuel ratio and can be based on empirical values.

The process steps of query block 312, query block 316, block 320, and query block 324 can occur in any order in the process, with the proviso that query block 324 can occur prior to block 328 and block 330 and that all of the correction factors are obtained prior to block 332.

Block 332 can determine a corrected hydrogen mass flow based on the mass hydrogen flow determined in block 330; the mass air flow rate of change correction factor determined in block 322; where determined, the engine coolant temperature correction factor determined in block 314 and the exhaust gas temperature correction factor determined in block 318; a mass air flow adaptive tuning correction factor, and a scaling factor. The corrected hydrogen mass flow, MHF, can be determined based on the following equation:

$$MHF = MHF_C(MHF_B * EGT_C * MAFdT_C + AT_C)$$

where $MHR_C$ is a scaling factor, which is set to a value of 1 unless otherwise indicated by a user; $MHF_B$ is mass air flow determined in block 330, $EGT_C$ is the exhaust gas temperature correction factor as determined in block 318, $MAFdT_C$ is the mass air flow rate of change as determined in block 320, $AT_C$ is an adaptive tuning correction factor. The adaptive tuning factor can be determined by retrieving a value either from a lookup table based on previous testing if the determined mass air flow and the air to fuel ratio determined in the process are in the range of the values in the look up table; or can be generated in a software program.

The corrected hydrogen mass flow can then be output to a hydrogen flow control system to enact a physical change in the hydrogen flowrate to the engine if desired in block 334. After the corrected hydrogen mass flow is output, query block 336 can determine if the engine is still running. When query block 336 returns a positive, then the process can repeat. When query block 336 returns a negative, then the process can determine that the engine has stopped in oval 338.

This process for calculating the amount of hydrogen for addition to an engine has several benefits. The process can correct for high engine coolant temperature, which is a slow responding indicator of the combustion temperature, by limiting the flow of hydrogen, which can ultimately reduce the risk of damage to the engine. For example, engine damage can occur when the engine temperature is persistently high. These high temperatures can occur when the cooling system is compromised and can be mitigated, at least, in part by adjusting the flow of hydrogen to the engine. The process can further correct for a high exhaust gas temperature, which is a relatively fast responding indicator of combustion temperature, by limiting the hydrogen flow to the engine, which can help to ensure that the hydrogen added will not increase the combustion temperature above a safe operating temperature. The safe operating temperature, for example, can be experimentally determined or can be obtained from engine manufacturer specifications.

The process for calculating the amount of hydrogen for addition to an engine can correct for a mass air flow rate of change as the mass air flow rate of change can detect changes in the power demand. Using the rate of change of the mass air flow rate to the engine can allow for a quicker adjustment to the hydrogen flow into the engine by attempting to predict the future mass air flow rate instead of waiting until the mass air flow rate actually changes in the future. Using the mass air flow rate of change correction factor can allow the system to respond to transients more quickly by increasing or decreasing the hydrogen flow to the engine to better match future hydrogen demand. The mass air flow rate of change correction factor can be determined based on one or more engine parameters such as accelerator pedal position, engine load, engine speed, mass air flow, and exhaust oxygen content. These parameters can indicate a change in engine power demand, which can result in a desired change in the hydrogen flow rate by a factor proportional to the rate of change, which can help the system respond to transients more quickly.

Furthermore the process for calculating the amount of hydrogen for addition to an engine can take into account the mass air flow and the air to fuel ratio, where the mass air flow, for example, can be measured by a mass air flow meter and the air to fuel ratio can be determined based on the oxygen content in the exhaust. When hydrogen is added to the combustion air, the oxygen it consumes during combustion can be accounted for to correct the air to hydrocarbon fuel ratio. When the air to hydrocarbon fuel ratio is high there is an abundance of air and the ignition and oxidation of the fuel progresses quickly and a reduced amount of hydrogen is needed. Conversely, when the air to hydrocarbon fuel ratio is low, there is a comparatively small amount of air and ignition takes more time. In this state, an increased amount of hydrogen can be added to facilitate reaching a peak cylinder pressure earlier in the power-stroke. An empirically developed data set can be developed to relate the air to hydrocarbon fuel ratio to the mass air flow to determine optimal quantity of hydrogen to be added when specific air to hydrocarbon fuel ratio and the mass air flow values are being used. This control approach can utilizes combustion parameters common to combustion engines and can be adaptable to any engine size or engine specific manufacturer values as the mass flow of air and the byproducts of combustion actively predict the quantity of hydrogen required to achieve an increased ignition rate. The predicted hydrogen quantity can then be used to control a gaseous fuel injector or directly control the electrolyzer's reaction rate.

Further still, the process for calculating the amount of hydrogen for addition to an engine can take into account an adaptive tuning correction factor and can actively calculate and remember the most effective quantity of hydrogen based on the current mass air flow and air to fuel ratio being used. Here, the equation illustrates how the control software can make changes to the hydrogen mass flow based on the mass air flow rate and air to fuel ratio and monitor the effect that the change has on engine power demand. The engine power demand can be measured using a torque request parameter acquired from, for example, a vehicle digital diagnostic bus. The torque request parameter can be used to determine a change in engine torque output without measuring the actual engine torque output on the engine's crank shaft, instead the torque request parameter can indicate a relative engine power demand correlating to a specific mass air flow rate and air to fuel ratio. If the addition or subtraction of hydrogen at a mass air flow rate and air to fuel ratio results in an increase in the engine torque output, then the torque request parameter to maintain engine torque output is reduced. A reduction in torque request under these conditions indicates that the changed hydrogen mass flow at the mass air flow rate and air to fuel ratio had a positive effect. If the positive effect persists over time at the mass air flow rate and air to fuel ratio, then the correction factor can be determined and stored in a correction table that can map mass air flow rate and air to fuel ratio to adaptively calculate ideal hydrogen mass flow rates for a specific engine. Likewise, if a change in hydrogen mass flow results in a decrease of the engine torque output, then the standard hydrogen mass flow for that mass air flow rate and air to fuel ratio would be more effective than the adaptive correction factor under test so that this factor would not be saved. This disclosed auto tuning algorithm can account for the exhaust gas temperature, the air intake temperature, and the engine coolant temperature to provide an improved determination of the amount of hydrogen to be added at a given set of conditions.

In order to illustrate this concept, one can consider a diesel truck driving up a long hill with hydrogen is being added to the engine at the standard rate as determined by a lookup table. The adaptive tuning algorithm can then start to test the effect of a minor increase to the hydrogen flow rate. The change in hydrogen flow rate causes the engine torque output to increase, which increases the vehicle speed, potentially resulting in a vehicle operator to ease off of the accelerator pedal, which controls the torque request parameter, in order to maintain a desired speed. The adaptive tuning algorithm can then save the data that under the given set of conditions, an increase in the hydrogen flow rate results in an increase in the output torque.

Figure 8:
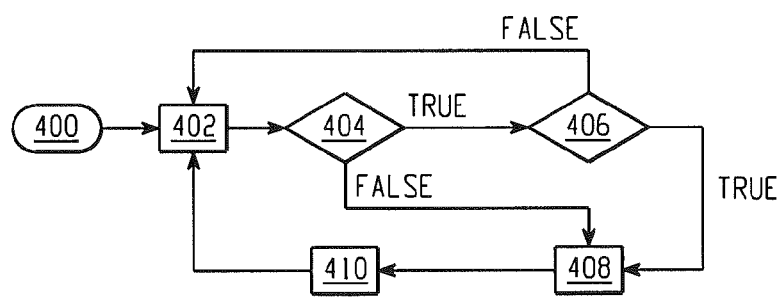
FIG. 8 is an illustration of an embodiment of a control loop for controlling the methanol to water ratio.
Figure 9:
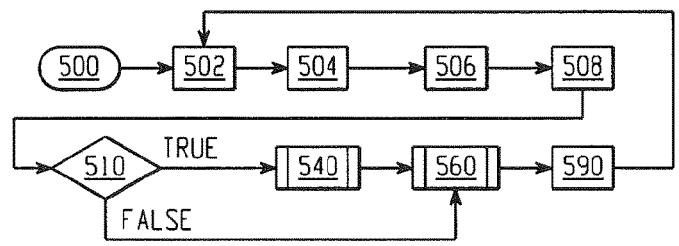
FIG. 9 is an illustration of an embodiment of a control loop for controlling the methanol to water ratio.

FIGS. 8 and 9 are illustrations of embodiments of a control loop for controlling the methanol to water ratio. FIG. 8 illustrates the process can start in oval 400 when the engine is started but, the process could run continuously or be started by other event, for example, a change in ambient temperature. Block 402 can determine a methanol concentration of methanol mixture in the methanol loop. Query block 404 can determine if a freezing point of the methanol mixture is less than or equal to 10° C. less than an ambient temperature. When query block 404 returns a negative, then block 408 can output that valve V5 be open for an amount of time to allow the feed methanol to flow into the methanol loop. The amount of time can be 5 to 300 seconds. After the amount of time has passed and the valve V5 is closed, block 410 can allow the process to wait for a wait time, such as 30 to 3600 seconds to allow a concentration of the methanol mixture to stabilize. Wait time is highly dependent on the volume of the loop and flow rate through the loop. After the wait time, block 402 can again determine a methanol concentration of methanol mixture the methanol loop.

When query block 404 returns a positive, query block 406 can determine if a concentration is less than a threshold concentration. The threshold concentration can be 1 to 5 mol %. When query block 406 returns a negative, block 402 can again determine a methanol concentration of methanol mixture the methanol loop. When query block 406 returns a positive, then then block 408 can output that valve V5 be open for an amount of time to allow the feed methanol to flow into the methanol loop. The amount of time can be 5 to 300 seconds. After the amount of time has passed and the valve V5 is closed, block 410 can allow the process to wait for a wait time, such as 305 to 3600 seconds to allow a concentration of the methanol mixture to stabilize. Wait time is highly dependent on the volume of the loop and flow rate through the loop. After the wait time, block 402 can again determine a methanol concentration of methanol mixture the methanol loop.

FIG. 8 illustrates the process can start in oval 500 when the engine is started but, it should be understood that the process could be occurring continuously or initiated by a different event, for example, based on changes in ambient temperature. Block 502 can determine a methanol concentration of methanol mixture in the methanol loop. Block 504 can determine a temperature of the methanol mixture. Block 506 can determine an ambient temperature. Block 508 can determine a heating temperature set point. The heating temperature set point can be determined by retrieving the heating temperature set point from a database based on the methanol concentration determined in block 502. Query block 510 can determine if an elapsed time has passed a threshold time since determining the heating temperature set point. The threshold time can be 0.08 to 2 hours, or 0.08 to 0.5 hours. When query block 510 returns a negative, then block 560 can determine a maintenance level concentration. When query block 510 returns a positive, then block 540 can determine a methanol concentration set point and block 560 can determine a maintenance level concentration. Block 590 can determine if an elapsed time has passed a threshold, for example, the threshold can be 1 to 10 minutes. When the elapsed time equals the threshold time, block 502 can again determine the methanol concentration of the methanol loop.

Figure 10:
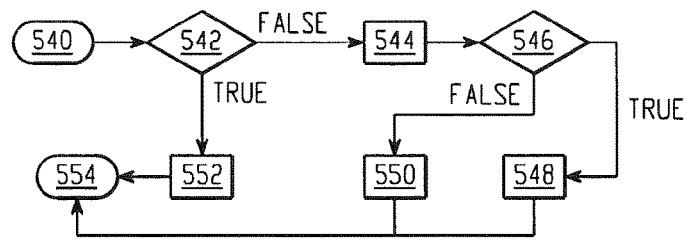
FIG. 10 is an illustration of an embodiment of a control loop for determining the methanol concentration of the control loop of FIG. 9.

FIG. 10 illustrates a process of determining the methanol concentration set point of block 540. Query block 542 can determine if the ambient temperature determined in block 506 is greater than a temperature threshold. The temperature threshold can be 0 to 3° C., for example, 2.5° C. When query block 542 returns a positive, then block 552 can determine the methanol concentration set point is 10 to 15 wt %, based on the total weight of the methanol mixture.

When query block 542 returns a negative, then block 544 can determine a liquid maintenance concentration for the methanol mixture at the ambient temperature. For example, block 544 can retrieve the liquid maintenance concentration at a temperature that is a degree amount, such as 5 to 15° C., minus the ambient temperature. Query block 546 can determine if the liquid maintenance concentration is less than or equal to a concentration threshold, for example, the concentration threshold can be 40 to 50 wt % methanol based on the total weight of the methanol mixture. When query block 546 returns negative, then block 550 returns the set point methanol concentration to be equal to the concentration threshold. When block 546 returns positive, then block 548 returns the methanol set point concentration to be the liquid maintenance concentration. Block 554 returns the set point methanol concentration.

Figure 11:
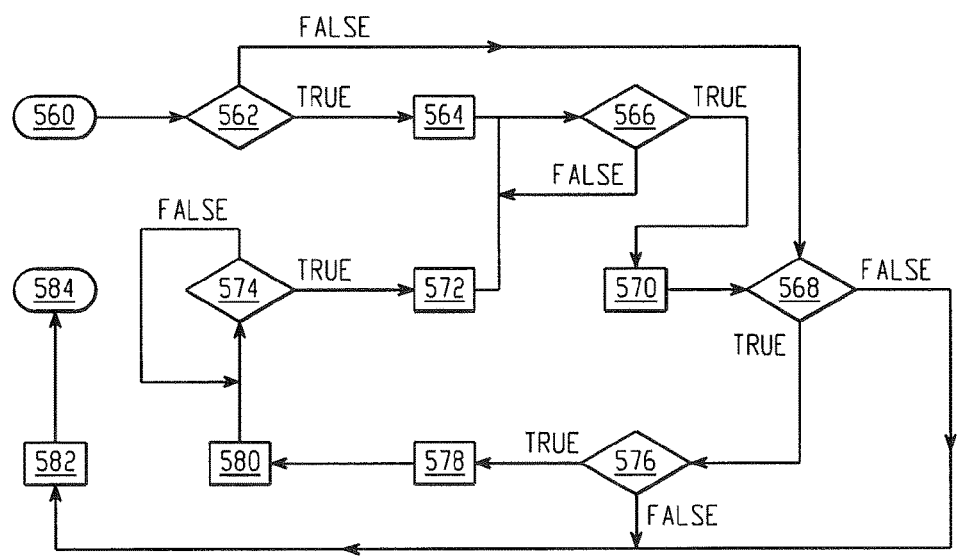
FIG. 11 is an illustration of an embodiment of a control loop for determining the methanol level of the control loop of FIG. 9.

FIG. 11 illustrates a process of determining the methanol level of block 560. Query block 562 can determine if a methanol mixture level in the base methanol reservoir 110 is low. A low methanol mixture level can be determined by determining that the methanol level is below a height in the tank, for example, as determined by a liquid level sensor. When query block 562 returns a negative, then query block 568 can determine if the methanol concentration is less than a methanol concentration set point.

When query block 568 returns a negative, then block 582 can send a close valve command to close valve V5. When query block 568 returns a positive, then query block 576 can determine if purge valve V2 has been opened in this iteration of process 560. When query block 576 returns a negative, then block 582 can send a close valve command to close valve V5.

When block 562 returns a positive, then block 564 can send an open valve command to open valve V5 to allow the feed methanol to flow into the methanol loop. Query block 566 can determine if the methanol mixture level in the base methanol reservoir 110 is high. A high methanol mixture level can be determined by determining that the methanol level is above a height in the tank, for example, as determined by a liquid level sensor. When query block 566 returns a negative, the query block 566 can again query if the liquid level is high. When query block 566 returns a positive, then block 570 can wait an amount of time, for example, 0.1 to 10 minutes, or 0.25 to 5 minutes to allow the liquid level to fill to greater than a high liquid level. Query block 568 can determine if the methanol concentration is less than a methanol concentration set point.

When query block 576 returns a positive, then block 578 can send a command to open valve V5 to allow the feed methanol to flow into the methanol loop. Block 580 can send a command to open purge valve V2 to allow the methanol mixture from the methanol loop to flow back into the source methanol tank 10. Query block 574 can determine if a liquid level in the base methanol reservoir 110 is low. When query block 574 returns a negative, then the query block 574 can again determine if a liquid level in the base methanol reservoir 110 is low. When query block 574 returns a positive, then Block 572 can send set a variable to indicate purge valve V2 has been opened in this iteration of process 560, next a command to close purge valve V2 to stop flow of the methanol mixture from the methanol loop to source methanol reservoir 10 and query block 566 can again determine if the liquid level in the base methanol reservoir 110 is high.

It is noted that in input blocks where information, such as temperature and concentration, is received, the desired information can be directly received or a data can be received that can be converted to the desired information. For example, a concentration sensor can output the methanol concentration directly and the determining the methanol concentration can comprise receiving the methanol concentration from the concentration sensor; or the sensor can output a concentration data value, such as a liquid density, and the determining the methanol concentration can comprise calculating the methanol concentration based on the concentration data value.

EXAMPLES

The following examples were performed using a hydrogen production system as illustrated in FIG. 2, where electrolyzer stream condenser 152 was not present, but a heater H, a particulate filter, a deionizing filter, pump P1, and methanol concentration sensor 70 as illustrated in FIG. 3 were present. The ambient temperature was 18° C., the methanol concentration in the loop was 25 wt %, and the electrolyzer temperature was 27° C.

The electrolyzer used in the examples utilizes an anode side support screen and a cathode side support screen comprising 316 grade stainless steel coated with gold and the membrane was a Nafion 212 membrane with a hot pressed catalyst layer obtained from FUELCELLSETC.

Example 1

Time to Start-up

Figure 12:
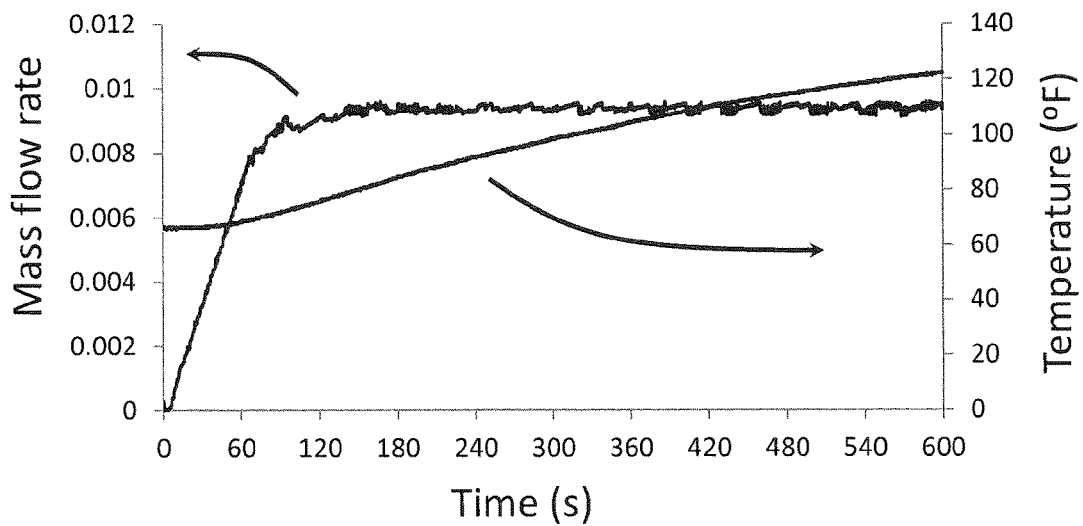
FIG. 12 is a graphical illustration of the mass flow rate and temperature versus time after start-up of Example 1.

The hydrogen production system was started and the mass flow rate and temperature versus time was measured, where time equals 0 is the time when the system was turned on. FIG. 12 illustrates that the system attained a steady state flow rate after only 90 seconds (s), where the units of the mass flow rate are units of mass standard liters per minute of flow per square centimeters of catalyst. It is noted that this short start-up can likewise be achieved utilizing a system as illustrated, for example, in FIG. 1.

Example 2

Reaction Efficiency

Figure 13:
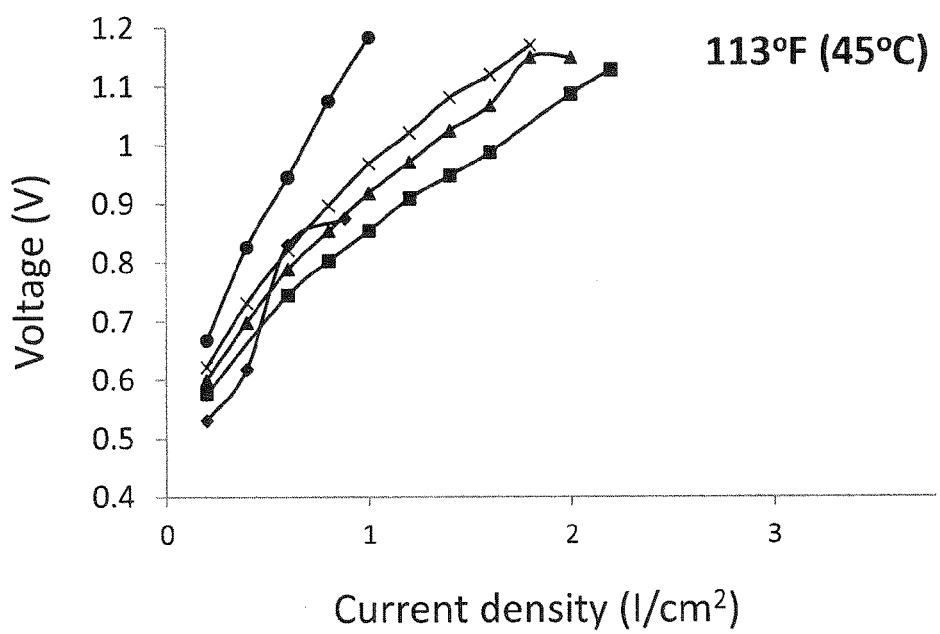
FIGS. 13-15 are graphical illustrations of voltage versus current density at varying temperatures and methanol concentrations of Example 2.
Figure 14:
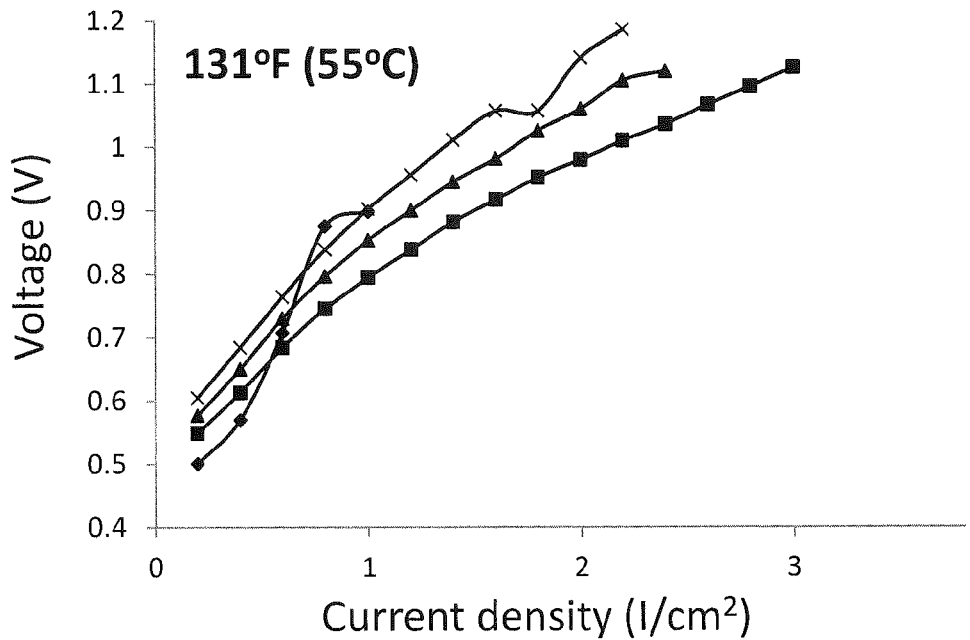
Figure 15:
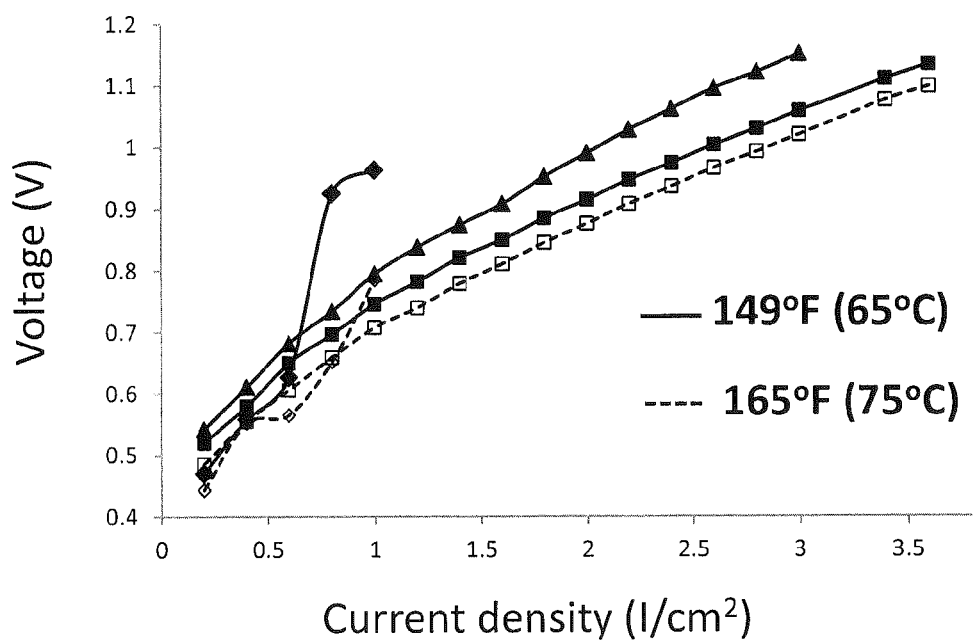

In Example 2, several experiments were performed by varying the current density in the electrolyzer at different temperatures and at different methanol concentrations of the methanol solution in the methanol loop. The results are illustrated in FIGS. 13-15, where FIG. 13 illustrates the results of the experiments performed at 45° C., FIG. 14 illustrates the results of the experiments performed at 55° C., and FIG. 15 illustrates the results of the experiments performed at 65° C. (solid line) and at 75° C. (dotted line). In the graphs, the diamonds represent data taken using a 5 wt % methanol solution, the squares represent data taken using a 15 wt % methanol solution, the triangles represent data taken using a 25 wt % methanol solution, the Xs represent data taken using a 45 wt % methanol solution, and the circles represent data taken using a 65 wt % methanol solution.

FIGS. 13-15 clearly illustrate that as temperature is increased, the faradaic efficiency (or how much energy is used to cause the reaction to occur) is increased as is illustrated by the increasing voltage, and the limiting current density is increased. FIGS. 13-15 further illustrate that when the methanol solution in the methanol loop has a concentration of only 5 wt % methanol, the methanol concentration is too low for effective oxidation at the catalyst resulting in a reduction in efficiency and a relatively low limiting current density.

FIG. 13 further illustrates that at a concentration of 65 wt %, a limiting factor of the reaction can be the relatively low temperature required to maintain membrane integrity and the lack of excess water contributes to relatively lower efficiency and limiting current density. FIG. 15 illustrates that excellent performance, as indicated by a high limiting current density (illustrating that the catalyst is being used efficiency) and a comparatively low voltage across the curve is achieved at high temperatures of 65° C. and 75° C. and at a methanol concentration of 10 to 30 wt %.

Set forth below are various embodiments of the present disclosure.

Embodiment 1: A system for producing hydrogen, the system comprising: a source methanol reservoir comprising a source methanol outlet and a source methanol inlet; a methanol electrolyzer for converting methanol to hydrogen and carbon dioxide, wherein the methanol electrolyzer comprises an electrolyzer inlet, a electrolyzer hydrogen outlet, and a electrolyzer methanol outlet; a base methanol reservoir comprising a reservoir methanol inlet, a reservoir hydrogen outlet, and a reservoir methanol outlet, wherein the electrolyzer methanol outlet is in fluid communication with the reservoir methanol inlet, wherein the reservoir methanol outlet is in fluid communication with the electrolyzer inlet and the source methanol inlet; wherein the methanol electrolyzer and the base methanol reservoir form a methanol loop.

Embodiment 2: The system of Embodiment 1, wherein the base methanol reservoir further comprises a reservoir hydrogen inlet; and wherein the electrolyzer hydrogen outlet is in fluid communication with the reservoir hydrogen inlet.

Embodiment 3: The system of Embodiment 2, further comprising 1) an reservoir stream condenser comprising a reservoir condenser inlet and a reservoir condenser outlet and a reservoir liquid separator comprising a reservoir separator inlet, a reservoir separator outlet, and a reservoir hydrogen product outlet; wherein the reservoir condenser inlet is in fluid communication with the reservoir hydrogen outlet; wherein the reservoir condenser outlet is in fluid communication with the reservoir separator inlet; wherein the reservoir separator outlet is in fluid communication with the methanol loop; or 2) further comprising the reservoir liquid separator comprising the reservoir separator inlet, the reservoir separator outlet, and the reservoir hydrogen product outlet; wherein the reservoir hydrogen product outlet is in fluid communication with the reservoir separator inlet; wherein the reservoir separator outlet is in fluid communication with the methanol loop.

Embodiment 4: The system of Embodiment 3, wherein the reservoir separator outlet is in fluid communication with the base methanol reservoir below a low liquid sensor.

Embodiment 5: The system of Embodiment 3, further comprising a reservoir condenser tank comprising a reservoir tank inlet and a reservoir tank outlet; wherein the reservoir separator outlet is in fluid communication with the reservoir tank inlet; and wherein the reservoir tank outlet is in fluid communication with the electrolyzer inlet.

Embodiment 6: The system of Embodiment 1, further comprising 1) an electrolyzer stream condenser comprising an electrolyzer condenser inlet and an electrolyzer condenser outlet; an electrolyzer liquid separator comprising an electrolyzer separator inlet, an electrolyzer separator outlet, and an electrolyzer hydrogen product outlet; wherein the electrolyzer condenser inlet is in fluid communication with the electrolyzer hydrogen outlet; wherein the electrolyzer condenser outlet is in fluid communication with the electrolyzer separator inlet; wherein the electrolyzer separator outlet is in fluid communication with the methanol loop; or 2) further comprising the electrolyzer liquid separator comprising the electrolyzer separator inlet, the electrolyzer separator outlet, and the electrolyzer hydrogen product outlet; wherein the electrolyzer hydrogen outlet is in fluid communication with the electrolyzer separator inlet; wherein the electrolyzer separator outlet is in fluid communication with the methanol loop.

Embodiment 7: The system of Embodiment 6, wherein the electrolyzer separator outlet is in fluid communication with the base methanol reservoir below a low liquid level sensor.

Embodiment 8: The system of Embodiment 6, further comprising an electrolyzer condenser tank comprising an electrolyzer tank inlet and an electrolyzer tank outlet; wherein the electrolyzer separator outlet is in fluid communication with the electrolyzer tank inlet; wherein the electrolyzer tank outlet is in fluid communication with the electrolyzer inlet.

Embodiment 9: The system of any one of the preceding embodiments, wherein the base methanol reservoir comprises at least one of a low liquid level sensor and a high liquid level sensor.

Embodiment 10: The system of any one of the preceding embodiments, further comprising a pressure pump, wherein the pressure pump comprises a pump inlet and pump outlet, wherein the pump inlet is in fluid communication with the source methanol reservoir or in fluid communication with the base methanol reservoir and is located upstream of the electrolyzer, wherein the pressure pump is capable of generating a pressure differential between pump inlet and pump outlet of 1 kPa to 70 MPa.

Embodiment 11: The system of any one of the preceding embodiments, further comprising a methanol concentration sensor located in the methanol loop.

Embodiment 12: The system of Embodiment 11, wherein the methanol concentration sensor comprises a liquid density sensor.

Embodiment 13: The system of any one of the preceding embodiments, further comprising a methanol purification system comprising a purification inlet and a purification outlet, and optionally, wherein the source methanol outlet and the reservoir methanol outlet are in fluid communication with the purification inlet and the purification outlet is in fluid communication with the electrolyzer inlet.

Embodiment 14: The system of Embodiment 13, wherein the methanol purification system comprises a particulate filter.

Embodiment 15: The system of any one of Embodiments 13-14, wherein the methanol purification system comprises a deionizing filter.

Embodiment 16: The system of any one of Embodiments 13-15, further comprising a membrane contactor, for example, located in between the particulate filter and a deionizing filter.

Embodiment 17: The system of Embodiment 16, further comprising a cation exchange filter upstream of membrane contactor and downstream of the particulate filter.

Embodiment 18: The system of any one of the preceding embodiments, wherein the reservoir methanol outlet is in fluid communication with the source methanol inlet; and wherein a concentration of a base methanol mixture in the base methanol reservoir is optionally maintained at 10 to 80 wt %, 25 to 80 wt %, or 10 to 25 wt %, or 10 to 15 wt % methanol, based on a total weight of the base methanol mixture and an ambient temperature being greater than 0° C. or is optionally maintained at 10 to 80 wt %, 25 to 80 wt %, or 10 to 65 wt %, or 10 to 45 wt % methanol, based on a total weight of the base methanol mixture and an ambient temperature being less than or equal to 0° C.

Embodiment 19: The system of any one of the preceding embodiments, wherein a concentration of a feed methanol in the source methanol reservoir is 10 to 100 wt %, or 25 to 100 wt %, or 50 to 90 wt %, or 60 to 80 wt %, based on a total weight of the feed methanol.

Embodiment 20: The system of any one of the preceding embodiments, further comprising a heat exchanger and optional heater located in the loop; wherein the heat exchanger is optionally in fluid communication with an engine cooling supply stream.

Embodiment 21: The system of any one of the preceding embodiments, further comprising one or both of an electrical generator for supplying electrical energy to the system and a heat source for supplying a thermal energy to the system.

Embodiment 22: A method of forming hydrogen comprising: adding a methanol feed stream comprising a feed methanol from a source methanol reservoir to a methanol loop; wherein the methanol loop comprises an electrolyzer, a base methanol reservoir, an electrolyzer inlet stream that directs a methanol mixture from the base methanol reservoir to the electrolyzer, and a methanol carbon dioxide stream that directs an unreacted methanol from the electrolyzer to the base methanol reservoir; electrolyzing the electrolyzer inlet stream in the electrolyzer to form hydrogen and carbon dioxide; directing a methanol carbon dioxide stream comprising the carbon dioxide and an unreacted methanol from the electrolyzer to the base methanol reservoir; removing a hydrogen stream comprising the hydrogen from the electrolyzer; removing a reservoir outlet stream and a circulated stream from the base methanol reservoir; adding at least a portion of the circulated stream to the electrolyzer inlet stream; maintaining a methanol concentration in the base methanol reservoir through the opening and closing of a purge valve that allows a purge stream to flow from the methanol loop to the source methanol reservoir and through the opening and closing of a feed valve that allows the methanol feed stream to flow from the source methanol reservoir into the methanol loop.

Embodiment 23: The method of Embodiment 22, further comprising directing the hydrogen stream to the base methanol reservoir.

Embodiment 24: The method of Embodiment 23, further comprising one of 1) condensing at least a portion of the reservoir outlet stream in a reservoir stream condenser to form a condensed reservoir stream; separating the condensed reservoir stream in a reservoir liquid separator to form a separated reservoir stream; and directing the separated reservoir stream to the methanol loop; or 2) directing at least a portion of the reservoir outlet stream to the reservoir liquid separator to form the separated reservoir stream; and directing the separated reservoir stream to the methanol loop.

Embodiment 25: The method of Embodiment 24, comprising directing the separated reservoir stream to the base methanol reservoir below a low liquid level sensor.

Embodiment 26: The method of Embodiment 24, further comprising directing the separated reservoir stream to a reservoir condenser tank; and directing a recycle reservoir stream from the reservoir condenser tank to the methanol loop.

Embodiment 27: The method Embodiment 23, comprising 1) directing the hydrogen stream to an electrolyzer stream condenser and condensing the hydrogen stream to form a condensed electrolyzer stream; separating the condensed electrolyzer stream in an electrolyzer liquid separator to form a separated electrolyzer stream and an electrolyzer hydrogen product stream; or 2) directing the hydrogen stream to the electrolyzer liquid separator to form a separated electrolyzer stream and a electrolyzer hydrogen product stream.

Embodiment 28The method of Embodiment 27, comprising adding the separated electrolyzer stream to the base methanol reservoir below a low liquid level sensor.

Embodiment 29: The method of Embodiment 27, comprising adding the separated electrolyzer stream to an electrolyzer condenser tank; and directing an electrolyzer recycle stream (162) from the electrolyzer condenser tank to the methanol loop.

Embodiment 30: The method of any of Embodiments 22-29, further comprising pressurizing the electrolyzer inlet stream and, after the pressurizing, electrolyzing the electrolyzer inlet stream in the electrolyzer.

Embodiment 31: The method of any of Embodiments 22-30, further comprising monitoring a liquid level in the base methanol reservoir via at least one of a low liquid level sensor and a high liquid level sensor.

Embodiment 32: The method of any of Embodiments 22-31, further comprising purifying a stream in the methanol loop, for example, the electrolyzer inlet stream in the purification system.

Embodiment 33: The method of Embodiment 32, wherein the purifying comprises purifying the stream in a particulate filter.

Embodiment 34: The method of any of Embodiments 32-33, wherein the purifying comprises purifying in a deionizing filter.

Embodiment 35: The method of any of Embodiments 32-34, further comprising purifying in a membrane contactor, for example, after purifying in the particulate filter and before purifying in the deionizing filter.

Embodiment 36: The method of Embodiment 35, further comprising introducing the stream to a cation exchange filter located upstream of the membrane contactor and to an anion exchange filter located downstream of the membrane contactor.

Embodiment 37: The method of any of Embodiments 22-36, further comprising determining a methanol concentration in the loop using a concentration sensor.

Embodiment 38: The method of Embodiment 37, wherein the methanol concentration sensor comprises a liquid density sensor.

Embodiment 39: The method of any of Embodiments 22-38, wherein the method comprises maintaining the methanol concentration of a base methanol mixture in the base methanol reservoir, wherein the methanol concentration of the base methanol mixture is optionally maintained at 10 to 80 wt %, 25 to 80 wt %, or 10 to 25 wt %, or 10 to 15 wt % methanol, based on a total weight of the base methanol mixture and an ambient temperature being greater than 0° C. or is optionally maintained at 10 to 80 wt %, 25 to 80 wt %, or 10 to 65 wt %, or 10 to 45 wt % methanol, based on a total weight of the base methanol mixture and an ambient temperature being less than or equal to 0° C.

Embodiment 40: The method of any one of Embodiments 22-39, wherein the pressurizing comprises generating a pressure differential in the pump of 1 kPa to 70 MPa.

Embodiment 41: The method of any one of Embodiments 22-40, wherein the methanol feed stream comprises 10 to 100 wt %, or 25 to 100 wt %, or 50 to 90 wt %, or 60 to 80 wt %, wt % of methanol, based on the total weight of the methanol feed stream.

Embodiment 42: The method of any one of Embodiments 22-41, further comprising heating a stream in the loop in a heat exchanger and an optional heater.

Embodiment 43: The method of Embodiment 42, wherein the heating comprise heating the stream via an engine cooling supply stream to form an engine cooling return stream.

Embodiment 44: The method of Embodiment 42, further comprising directing a engine cooling return stream to a vehicle engine.

Embodiment 45: The method of any one of Embodiments 22-44, further comprising mixing one of the reservoir hydrogen product stream, the reservoir outlet stream, the hydrogen stream, and the electrolyzer hydrogen product stream with a combustion air and then mixing with a hydrocarbon fuel source in an engine.

Embodiment 46: The method of Embodiment 45, wherein the hydrocarbon fuel source comprises diesel, gasoline, a jet fuel (such as JP-8), bunker oil, liquefied petroleum gas, compressed natural gas, liquefied natural gas, or a combination comprising at least one of the foregoing.

Embodiment 47: An electrolyzer cell assembly, comprising: an exchange membrane disposed between an anode and a cathode; one or both of an anode support screen disposed on an anode side of the exchange membrane and a cathode support screen disposed on a cathode side of the exchange membrane; an optional anode gas diffusion layer disposed on the anode side of the exchange membrane and between the anode support screen and the exchange membrane; a cathode diffusion layer disposed on the cathode side of the exchange membrane and between the cathode support screen and the exchange membrane; an anode flow field disposed on the anode side of the exchange membrane; and a cathode flow field disposed on the cathode side of the exchange membrane; wherein the anode flow field and the cathode flow field each comprise a flow channel.

Embodiment 48: The electrolyzer cell assembly of Embodiment 47, wherein at least one of the anode support screen and the cathode support screen comprises a carbon, a metal, or a combination comprising at least one of the foregoing; wherein the support screen is optionally in the form of a woven cloth, a non-woven cloth, an expanded metal screen, or a perforated metal screen.

Embodiment 49: The electrolyzer cell assembly of any one of Embodiments 47-49, wherein the optional anode support screen and the cathode support screen have one or both of a tensile strength of greater than or equal to 0.5 MPa and a flexural strength of greater than or equal to 10 MPa.

Embodiment 50: An electrolyzer comprising: the electrolyzer cell assembly of any one of Embodiments 47-49; a system configured to provide an organic fuel to the anode; and a cathode chamber configured to collect a hydrogen gas generated from electrolysis of the organic fuel; and a power supply connected to the anode and the cathode.

Embodiment 51: The system of any one of Embodiments 1-21 or the method of any one of Embodiments 22-45, wherein the electrolyzer comprises the electrolyzer cell assembly of any one of Embodiments 47-49 or the electrolyzer of Embodiment 50.

Embodiment 52: A computer implemented control method, the method comprising: determining a methanol concentration of a methanol solution in a methanol loop; optionally determining an ambient air temperature; retrieving a heating temperature set point based on the methanol concentration and setting the heating temperature set point in the methanol loop; determining a methanol concentration set point and a maintenance level concentration based on determining that an elapsed time since the setting the heating temperature set point is greater than or equal to a time threshold; calculating the maintenance level concentration based on determining that the elapsed time is less than the time threshold; measuring a time period prior to repeating the control method.

Embodiment 53: The method of Embodiment 52, further comprising repeating the control method.

Embodiment 54: The method of any one of Embodiments 52-53, wherein the time threshold is greater than or equal to 1 hour.

Embodiment 55: The method of any one of Embodiments 52-54, wherein the time period is 3 to 30 minutes, or 3 to 10 minutes.

Embodiment 56: The method of any one of Embodiments 52-55, wherein a concentration sensor outputs a concentration data value and the determining the methanol concentration comprises calculating the methanol concentration based on the concentration data value; or wherein the concentration sensor outputs the methanol concentration and the determining the methanol concentration comprises receiving the methanol concentration from the concentration sensor.

Embodiment 57: The method of any one of Embodiments 52-56, wherein the determining the methanol concentration set point comprises determining that the methanol concentration set point is 10 to 15 wt %, based on the total weight of the methanol solution and based on the ambient temperature being greater than or equal to a temperature threshold; wherein the temperature threshold can be 0 to 3° C., or 2.5° C.

Embodiment 58: The method of any one of Embodiments 52-57, wherein the determining the methanol concentration set point comprises determining that the ambient temperature is less than the temperature threshold; determining a liquid maintenance concentration for the methanol solution at the ambient temperature; based on the liquid maintenance concentration being less than a concentration threshold, determining that the methanol concentration set point is the concentration threshold; wherein the concentration threshold can be 40 to 50 wt % methanol is based on the total weight of the methanol solution.

Embodiment 59: The method of any one of Embodiments 52-58, wherein the determining the methanol concentration set point comprises determining that the ambient temperature is less than the temperature threshold; determining a liquid maintenance concentration for the methanol solution at the ambient temperature; determining that the methanol concentration set point is the liquid maintenance concentration based on the liquid maintenance concentration being greater than or equal to the concentration threshold.

Embodiment 60: The method of any one of Embodiments 52-59, wherein the determining the maintenance level concentration comprises determining that a methanol solution level in a base methanol reservoir is not low; and closing valve based on the methanol concentration being greater than or equal to the methanol concentration set point.

Embodiment 61: The method of any one of Embodiments 52-60, wherein the determining the maintenance level concentration comprises determining that a methanol solution level in a base methanol reservoir is not low; closing valve based on the methanol concentration being less than the methanol concentration set point and determining that the purge valve is closed.

Embodiment 62: The method of any one of Embodiments 52-61, wherein the determining the maintenance level concentration comprises determining that a methanol solution level in a base methanol reservoir is not low; opening a purge valve based on the methanol concentration being less than the methanol concentration set point and the purge valve having been purged (for example, having been opened and closed at least once in the present iteration of the process); maintaining the purge valve being open until the methanol solution level is determined to be low; closing the purge valve based on the methanol solution level being determined to be low; again maintaining the valve being open at least until the methanol solution level is determined to be high; again waiting for the wait period, for example, of 0.1 to 5 minutes based on determining that the methanol solution level is high; and determining which is greater, the methanol concentration or the methanol concentration set point; repeating the opening the purge valve, the maintaining the purge valve being open, the closing the purge valve, the again waiting for the wait period, and the determining which is greater until either the methanol concentration is less than the methanol concentration set point, followed by closing the valve; or the methanol concentration is greater than or equal to the methanol concentration set point and the purge valve having been purged (for example, having been opened and closed at least once in the present iteration of the process).

Embodiment 63: The method of any one of Embodiments 52-62, wherein the determining the maintenance level concentration comprises opening a valve based on determining that a methanol solution level in a base methanol reservoir is low; maintaining the valve being open at least until the methanol solution level is determined to be high; waiting for a wait period, for example, of 0.1 to 5 minutes based on determining that the methanol solution level is high; and after the waiting, closing valve based on the methanol concentration being greater than or equal to the methanol concentration set point.

Embodiment 64: The method of any one of Embodiments 52-63, wherein the determining the maintenance level concentration comprises opening a valve based on determining that a methanol solution level in a base methanol reservoir is low; maintaining the valve being open at least until the methanol solution level is determined to be high; waiting for a wait period, for example, of 0.1 to 5 minutes after determining that the methanol solution level is high; and closing valve based on the methanol concentration being less than the methanol concentration set point and a purge valve having been purged (for example, having been opened and closed at least once in the present iteration of the process).

Embodiment 65: The method of any one of Embodiments 52-64, wherein the determining the maintenance level concentration comprises opening a valve based on determining that a methanol solution level in a base methanol reservoir is low; maintaining the valve being open until the methanol solution level is determined to be high; waiting for a wait period, for example, of 0.1 to 5 minutes after determining that the methanol solution level is high; opening a purge valve based on the methanol concentration being less than the methanol concentration set point and the purge valve having been purged (for example, having been opened and closed at least once in the present iteration of the process); maintaining the purge valve being open until the methanol solution level is determined to be low; closing the purge valve based on the methanol solution level being determined to be low; again maintaining the valve being open at least until the methanol solution level is determined to be high; again waiting for the wait period, for example, of 0.1 to 5 minutes based on determining that the methanol solution level is high; and determining which is greater, the methanol concentration or the methanol concentration set point; repeating the opening the purge valve, the maintaining the purge valve being open, the closing the purge valve, the again waiting for the wait period, and the determining which is greater until either the methanol concentration is less than the methanol concentration set point, followed by closing the valve; or the methanol concentration is greater than or equal to the methanol concentration set point and the purge valve having been purged (for example, having been opened and closed at least once in the present iteration of the process).

Embodiment 66: A computer implemented control method for controlling a mass hydrogen flow in an engine, the method comprising: determining a mass air flow, an air to fuel ratio, an exhaust gas temperature, and an engine coolant temperature; retrieving an engine coolant temperature correction factor based on determining that the engine coolant temperature is greater than a threshold engine coolant temperature; retrieving an exhaust gas temperature correction factor based on determining that the exhaust gas temperature is greater than a threshold exhaust gas temperature; retrieving a mass air flow rate of change correction factor based on determining a mass air flow rate of change; calculating a diesel mass flow based determining that hydrogen is not being injected into an engine; or modifying the air to fuel ratio to account for oxygen being used to oxidize hydrogen based on determining that hydrogen is being injected and then calculating the diesel mass flow; wherein the diesel mass flow is determined based on the mass air flow and the air to fuel ratio; retrieving and setting a mass hydrogen flow based on the mass air flow and the air to fuel ratio; calculating a corrected mass hydrogen flow based on the mass hydrogen flow, the engine coolant temperature correction factor, the exhaust gas temperature correction factor, the mass air flow rate of change correction factor, a mass air flow adaptive tuning correction factor, and a scaling hydrogen mass flow correction factor; outputting the corrected mass hydrogen flow and changing the mass hydrogen flow; and repeating the method based on the engine still running.

Embodiment 67: A system, the system comprising: a memory having computer readable instructions; and one or more processors for executing the computer readable instructions, the computer readable instructions comprising the method of any one of Embodiments 52-66.

Embodiment 68: A computer program product, the computer program product comprising: a computer readable storage medium having program instructions embodied therewith, the program instructions executable by a processor to cause the processor to perform; a memory having computer readable instructions; and one or more processors for executing the computer readable instructions, the computer readable instructions comprising the method of any one of Embodiments 52-66.

Embodiment 69: A combustion engine comprising the system of any one of Embodiments 1-21, utilizing the method of any of Embodiments 23-45 or Embodiments 52-66, comprising the assembly of any one of Embodiments 47-49, comprising the electrolyzer of Embodiment 50, utilizing the system of Embodiment 67, or utilizing the product of Embodiment 68.

Embodiment 70: A vehicle or machine comprising the engine of Embodiment 69, wherein the vehicle is a boat, a car, a truck, a motorcycle, an airplane, or a bus, and wherein the machine is a construction machine, an electrical generator, or a mining machine.

Embodiment 71: Use of a hydrogen product stream formed using any one of the preceding embodiments.

In general, this disclosure can alternately comprise, consist of, or consist essentially of, any appropriate components herein disclosed. The disclosure can additionally, or alternatively, be formulated so as to be devoid, or substantially free, of any components, materials, ingredients, adjuvants or species used in the prior art compositions or that are otherwise not necessary to the achievement of the function and/or objectives of the present disclosure.

All ranges disclosed herein are inclusive of the endpoints, and the endpoints are independently combinable with each other (e.g., ranges of "up to 25 wt %, or, more specifically, 5 to 20 wt %", is inclusive of the endpoints and all intermediate values of the ranges of "5 to 25 wt %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or." The suffix "(s)" as used herein is intended to include both the singular and the plural of the term that it modifies, thereby including one or more of that term (e.g., the film(s) includes one or more films). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this disclosure belongs. Unless otherwise stated, test standards are the most recent as of the filing date of the application.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

In addition, it is to be understood that the described elements can be combined in any suitable manner in the various embodiments.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

The disclosure can relate to be a system, a method, and/or a computer program product. The computer program product can include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), microprocessor(s) (MCU), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present application claims priority to Provisional Application Ser. No. 62/078,298, filed on Nov. 11, 2014, which is incorporated herein by reference in its entirety.

I claim:

1. A system for producing hydrogen, the system comprising:
a source methanol reservoir comprising a source methanol outlet and a source methanol inlet;
a methanol electrolyzer for converting methanol to hydrogen and carbon dioxide, wherein the methanol electrolyzer comprises an electrolyzer inlet, a electrolyzer hydrogen outlet, and a electrolyzer methanol outlet;
a base methanol reservoir comprising a reservoir methanol inlet, a reservoir hydrogen outlet, and a reservoir methanol outlet, wherein the electrolyzer methanol outlet is in fluid communication with the reservoir methanol inlet, wherein the reservoir methanol outlet is in fluid communication with the electrolyzer inlet and the source methanol inlet;
wherein the methanol electrolyzer and the base methanol reservoir form a methanol loop.

2. The system of claim 1, wherein the electrolyzer hydrogen outlet is in fluid communication with a reservoir hydrogen inlet of the base methanol reservoir.

3. The system of claim 1, further comprising a pressure pump, wherein the pressure pump comprises a pump inlet and pump outlet, wherein the pump inlet is in fluid communication with the source methanol reservoir or in fluid communication with the base methanol reservoir and is located upstream of the electrolyzer, wherein the pressure pump is capable of generating a pressure differential between pump inlet and pump outlet of 1 kPa to 70 MPa.

4. The system of claim 1, further comprising a methanol concentration sensor located in the methanol loop.

5. The system of claim 1, further comprising a methanol purification system comprising a purification inlet and a purification outlet, and optionally, wherein the source methanol outlet and the reservoir methanol outlet are in fluid communication with the purification inlet and the purification outlet is in fluid communication with the electrolyzer inlet.

6. The system of claim 1, wherein a concentration of a feed methanol in the source methanol reservoir is 10 to 100 wt % based on a total weight of the feed methanol.

7. The system of claim 1, further comprising a heat exchanger and optional heater located in the loop; wherein the heat exchanger is in fluid communication with an engine cooling supply stream.

8. A method of forming hydrogen comprising:
adding a methanol feed stream comprising a feed methanol from a source methanol reservoir to a methanol loop; wherein the methanol loop comprises an electrolyzer, a base methanol reservoir, an electrolyzer inlet stream that directs a methanol mixture from the base methanol reservoir to the electrolyzer, and a methanol carbon dioxide stream that directs an unreacted methanol from the electrolyzer to the base methanol reservoir;
electrolyzing the electrolyzer inlet stream in the electrolyzer to form hydrogen and carbon dioxide;
directing a methanol carbon dioxide stream comprising the carbon dioxide and an unreacted methanol from the electrolyzer to the base methanol reservoir;
removing a hydrogen stream comprising the hydrogen from the electrolyzer;
removing a reservoir outlet stream and a circulated stream from the base methanol reservoir; adding at least a portion of the circulated stream to the electrolyzer inlet stream;

maintaining a methanol concentration in the base methanol reservoir through the opening and closing of a purge valve that allows a purge stream to flow from the methanol loop to the source methanol reservoir and through the opening and closing of a feed valve that allows the methanol feed stream to flow from the source methanol reservoir into the methanol loop.

9. The method of claim 8, further comprising directing the hydrogen stream to the base methanol reservoir.

10. The method of claim 8, further comprising pressurizing the electrolyzer inlet stream and, after the pressurizing, electrolyzing the electrolyzer inlet stream in the electrolyzer.

11. The method of claim 8, further comprising monitoring a liquid level in the base methanol reservoir via at least one of a low liquid level sensor and a high liquid level sensor.

12. The method of claim 8, further comprising purifying a stream in the methanol loop, for example, the electrolyzer inlet stream in the purification system.

13. The method of claim 8, further comprising determining a methanol concentration in the loop using a methanol concentration sensor.

14. The method of claim 10, wherein the pressurizing comprises generating a pressure differential in a pump of 1 kPa to 70 MPa.

15. The method of claim 8, wherein the methanol feed stream comprises 10 to 100 wt % of methanol, based on the total weight of the methanol feed stream.

16. The method of claim 8, further comprising heating a stream in the loop in a heat exchanger and an optional heater via an engine cooling supply stream to form an engine cooling return stream.

17. The method of claim 8, further comprising mixing one of the reservoir hydrogen product stream, the reservoir outlet stream, the hydrogen stream, and the electrolyzer hydrogen product stream with a combustion air to form a hydrogen air mixture; and then mixing the hydrogen air mixture with a hydrocarbon fuel source in an engine.

18. A combustion engine comprising the system of claim 1.

19. A vehicle or machine comprising the engine of claim 18.

20. The system of claim 1, wherein the methanol electrolyzer comprises
an exchange membrane disposed between an anode and a cathode;
one or both of an anode support screen disposed on an anode side of the exchange membrane and a cathode support screen disposed on a cathode side of the exchange membrane;
an optional anode gas diffusion layer disposed on the anode side of the exchange membrane and between the anode support screen and the exchange membrane;
an optional cathode gas diffusion layer disposed on the cathode side of the exchange membrane and between the cathode support screen and the exchange membrane;
an anode flow field disposed on the anode side of the exchange membrane; and
a cathode flow field disposed on the cathode side of the exchange membrane; wherein the anode flow field and the cathode flow field each comprise a flow channel;
a system configured to provide an organic fuel to the anode; and a cathode chamber configured to collect a hydrogen gas generated from electrolysis of the organic fuel; and
a power supply connected to the anode and the cathode.

* * * * *